Figure 1:
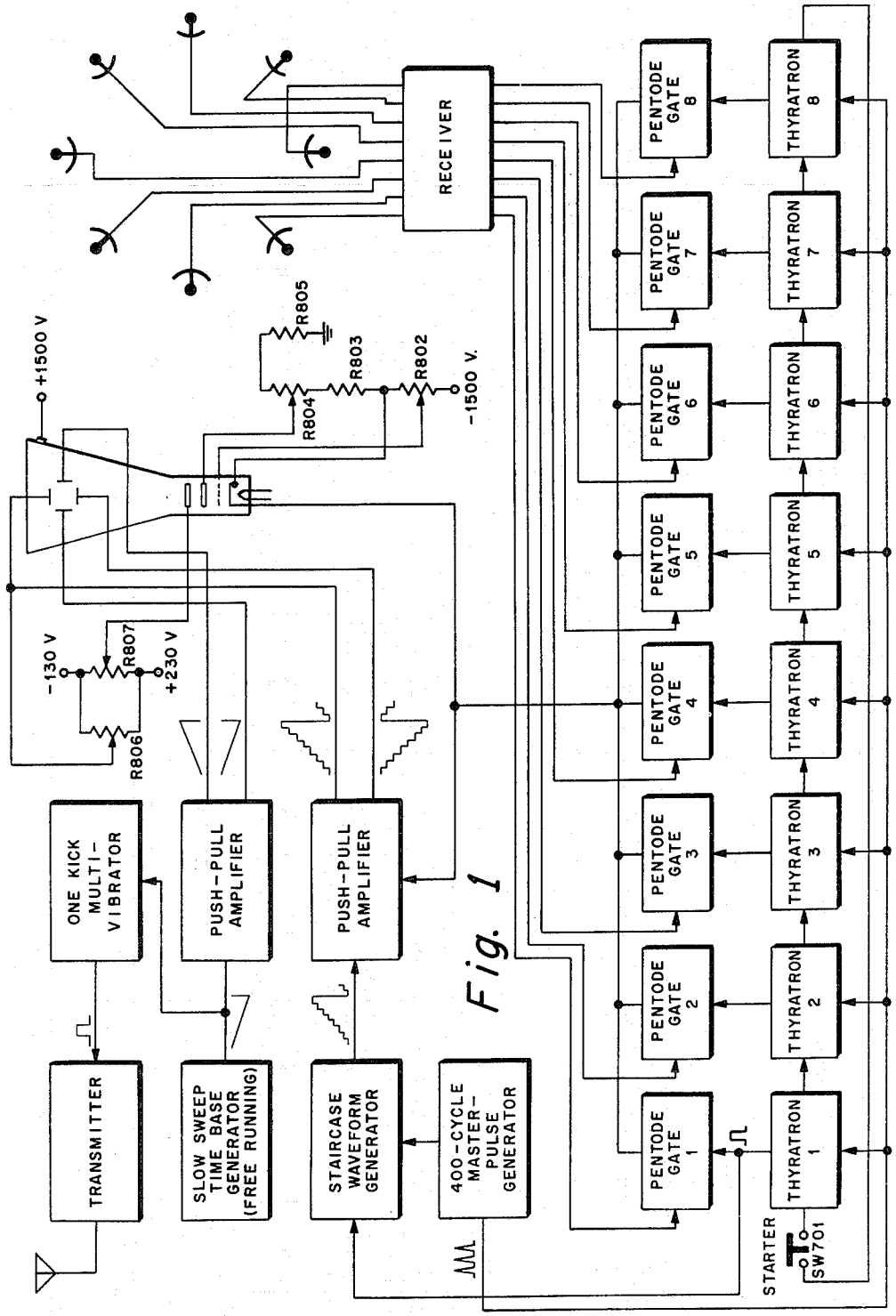

INVENTOR.
LESTER M. BERNBAUM
BY
ATTORNEYS

Dec. 30, 1958   L. M. BERNBAUM   2,866,967
TARGET INDICATING MECHANISM
Filed Oct. 20, 1953   7 Sheets-Sheet 4

INVENTOR.
LESTER M. BERNBAUM
BY
ATTORNEYS

Dec. 30, 1958 L. M. BERNBAUM 2,866,967
TARGET INDICATING MECHANISM
Filed Oct. 20, 1953 7 Sheets-Sheet 5

Dec. 30, 1958 L. M. BERNBAUM 2,866,967
TARGET INDICATING MECHANISM
Filed Oct. 20, 1953 7 Sheets-Sheet 6
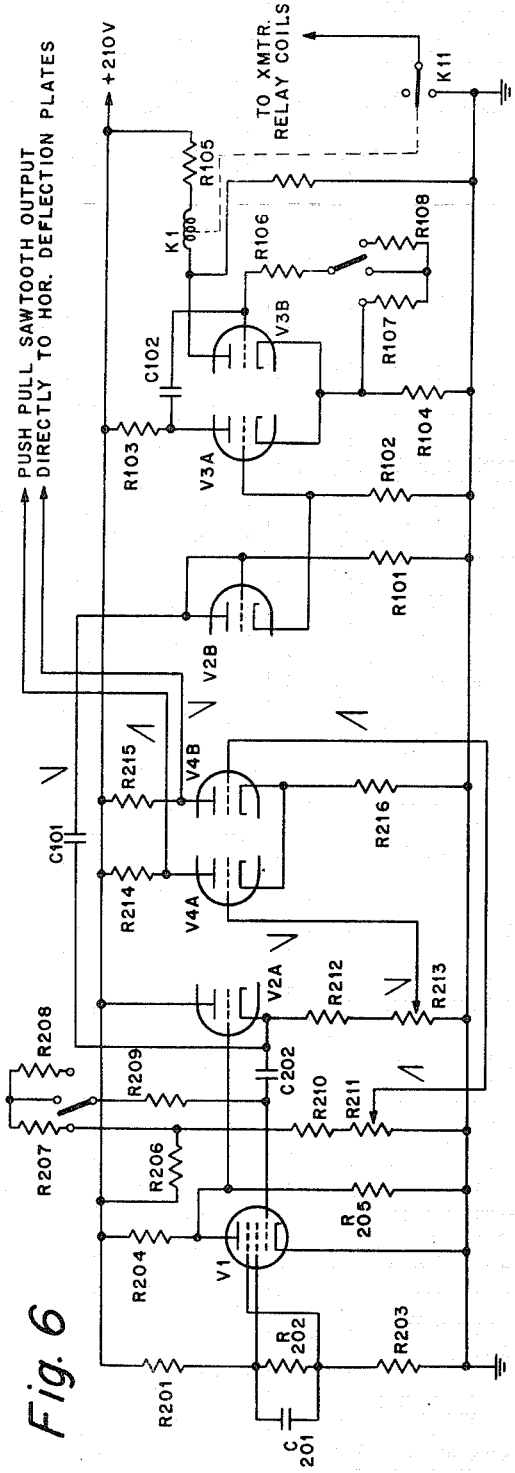
Fig. 6
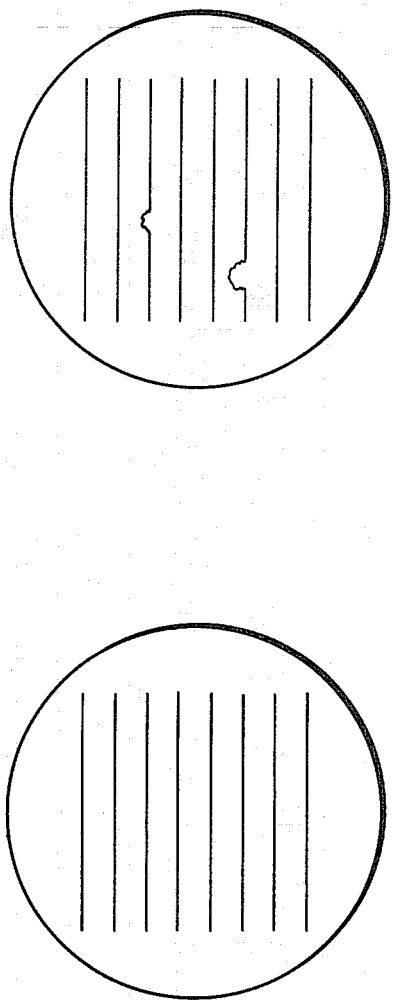
Fig. 8b
Fig. 8a
INVENTOR.
LESTER M. BERNBAUM
BY
ATTORNEYS

United States Patent Office 2,866,967
Patented Dec. 30, 1958

2,866,967

TARGET INDICATING MECHANISM

Lester M. Bernbaum, Philadelphia, Pa.

Application October 20, 1953, Serial No. 387,329

18 Claims. (Cl. 343—11)

(Granted under Title 35, U. S. Code (1952), sec. 266)

The invention described herein may be manufactured and used by or for the Government of the United States of America for governmental purposes without the payment of any royalties thereon or therefor.

The instant invention relates to a target indicator and in particular effects a mode of presentation of target signals from a plurality of separate channels presenting the targets in proper sequence on a multi-line A-scan display, constituting an entire omnidirectional receiving system for target indication.

Old methods of target searching utilized a mechanically rotating signal projection means and receiver. These known methods had the disadvantages of loss of time in detecting the target and possible loss of the target completely, notwithstanding the inherent disadvantages of a mechanical system. In addition, prior indicators were adapted to handle only a single channel for each gun.

The instant invention provides an omnidirectional indicating system presenting greater economy of operation, reduced initial cost due to elimination of all but one of the multi-gun channels required, more efficient operation of the circuits and greater possible accuracy due to the electrical synchronization possible by provision of a single gun eight-line A-scan indicating display. The present inventive apparatus presents improved design of components and circuits and provides quick target determination as well as avoiding possible loss of targets in some cases.

Accordingly, an important purpose of the invention is to produce an apparatus capable of presenting an A-scan presentation of a practical, non-rotating, directional display of range and azimuth of a target, using a single gun cathode ray tube.

Another object is to present an A-scan presentation of target signals from a plurality of separate channels and present them in proper sequence on a multi-line A-scan display.

Another purpose of the invention is to present a feasible target display system for giving target range for use with a non-rotating, multi-channel, directional receiving apparatus employing electronic commutation for proper sequential sampling of each channel.

Still another aim of the invention is to provide a receiver employing a cathode ray tube for visual indication wherein good regulation may be obtained under varying load conditions, such as brightness control, by means of a new and improved radio frequency high voltage power supply apparatus.

Still another object of the invention is to provide apparatus using an energy storage counter as a device to simulate a multi-gun cathode ray tube using a single gun cathode ray tube.

Another aim of the invention is to provide target signal receiving apparatus wherein synchronization of multiplexed signal channels with an energy storage counter provides reliability so that each signal channel is always admitted to the same line of a multi-line indicator.

Another aim of the invention is to provide a rugged compact apparatus, relatively inexpensive in initial cost and containing a minimum of circuit components for maximum results in providing search target apparatus, wherein greater accuracy, greater economy and reliability as well as faster operation and greater certainty of target detection are provided.

Figure 2A:
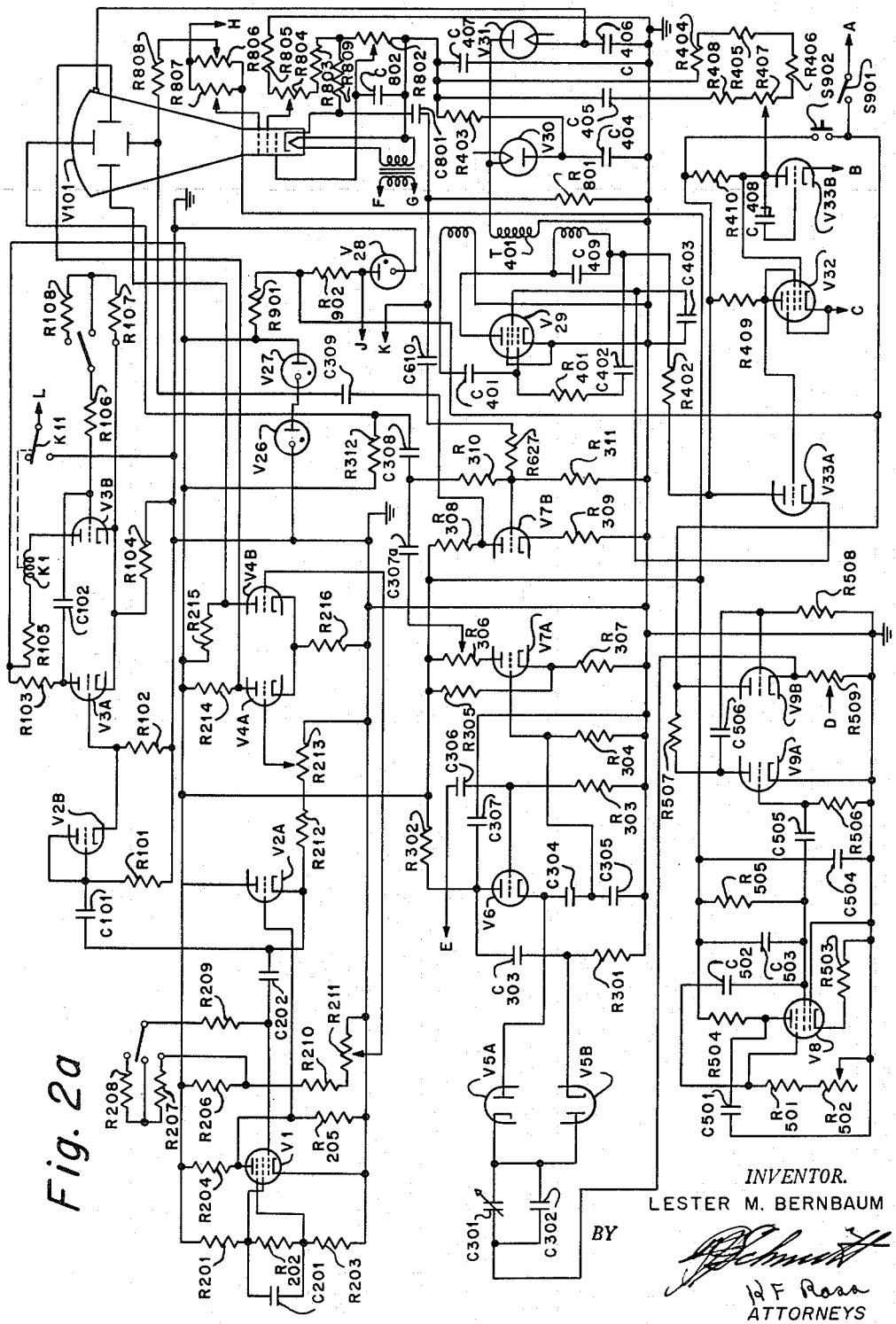
Figure 2B:
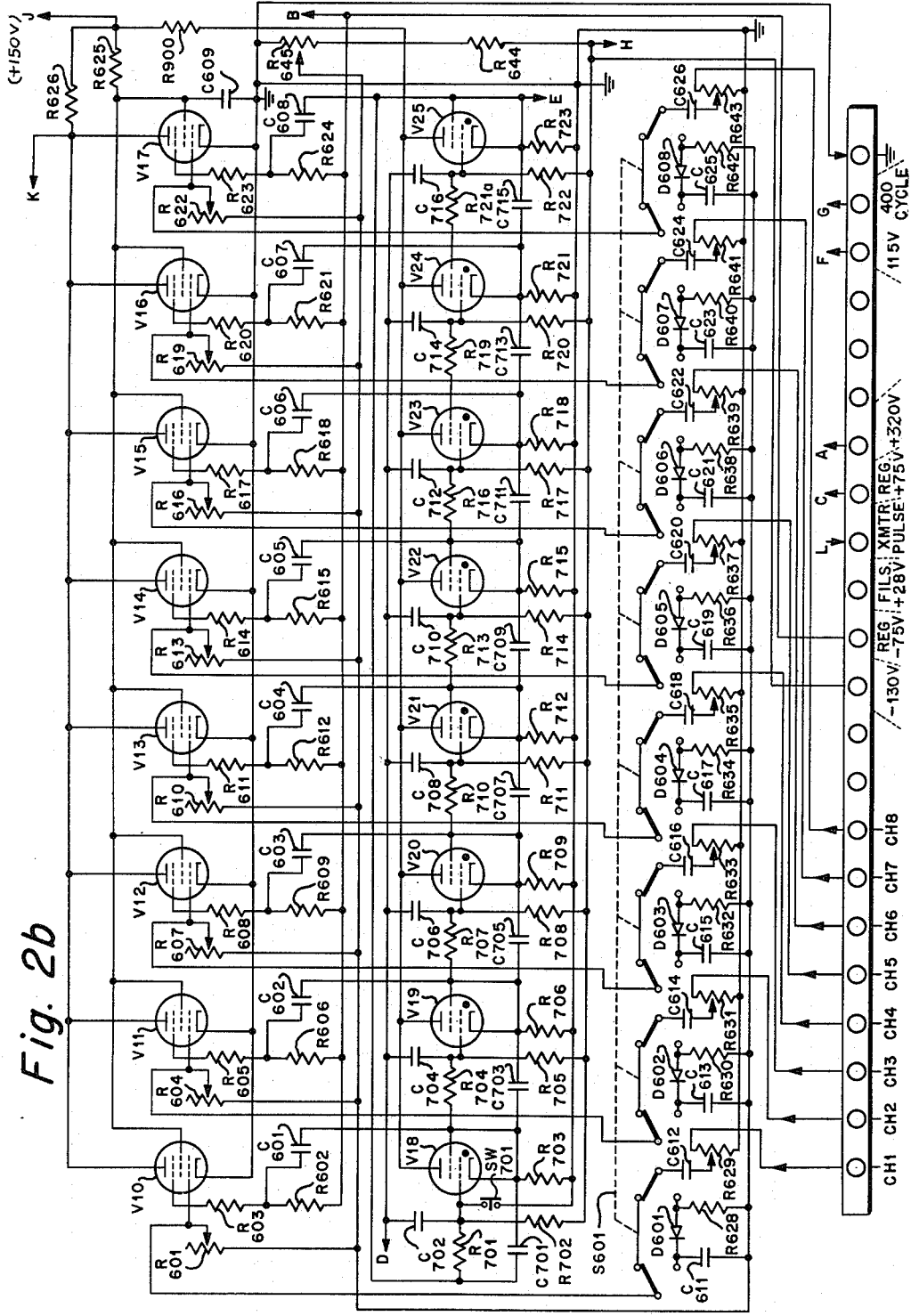
Figure 3:
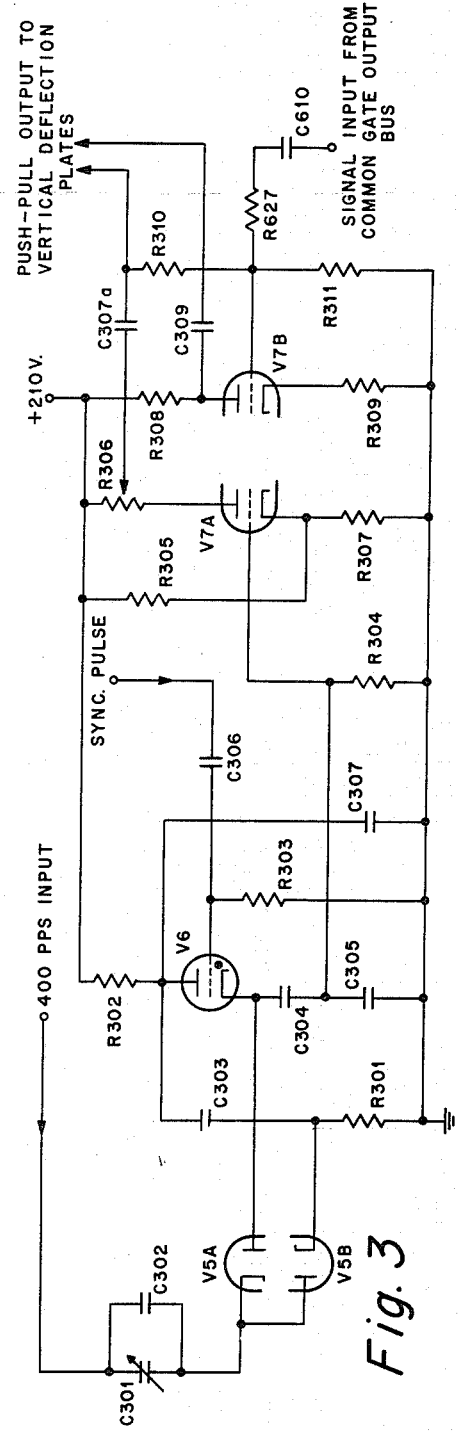
Figure 5:
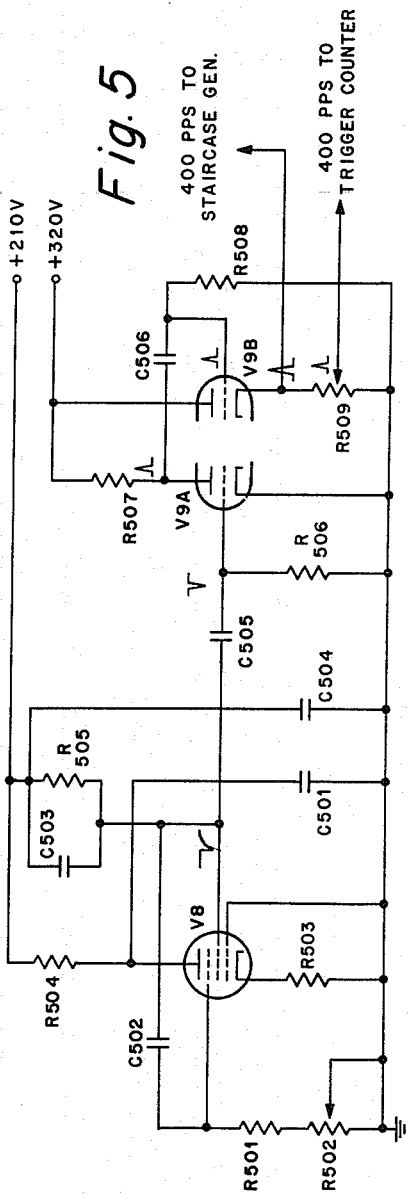
Figure 4:
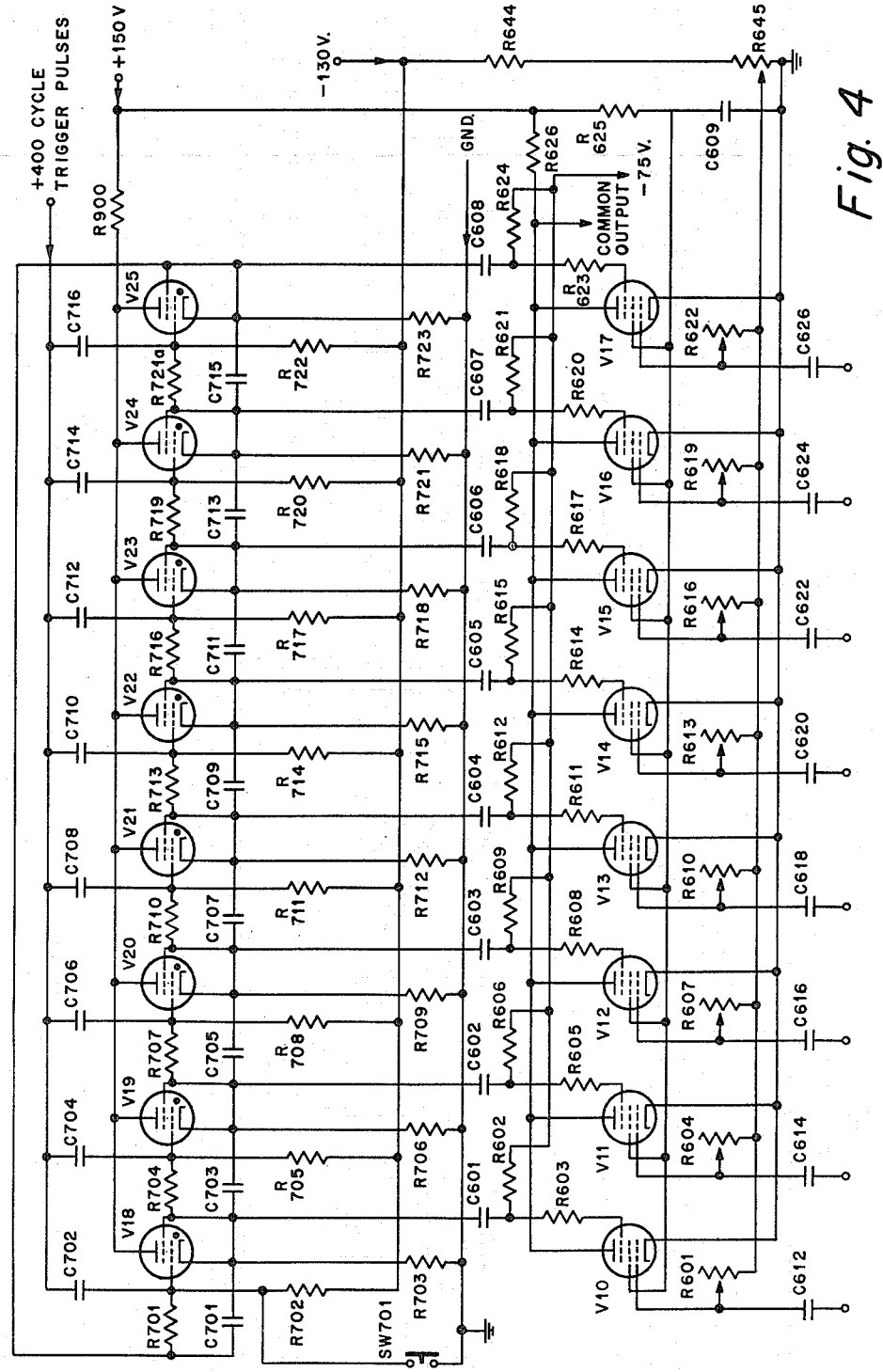
Figure 7:
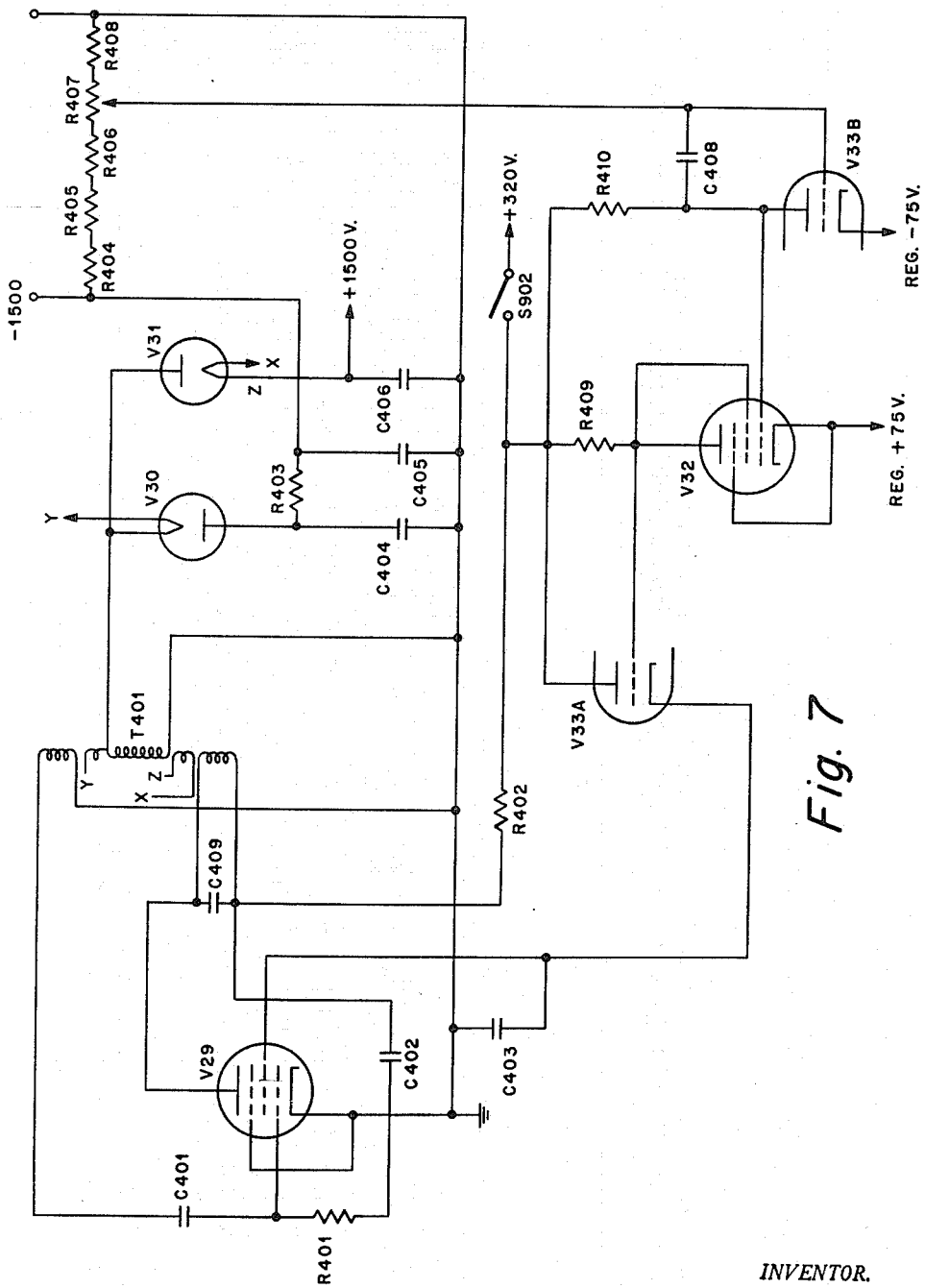

Other objects and many of the attendant advantages of this invention will be readily appreciated as the same becomes better understood by reference to the following detailed description when considered in connection with the accompanying drawings wherein:

Fig. 1 represents a block diagram of an illustrative target detection system embodying the apparatus of the instant invention, Fig. 2a represents a partial schematic diagram of the preferred embodiment of the apparatus of the present invention, Fig. 2b presents the remainder of the schematic diagram of a preferred embodiment of the apparatus of the instant invention wherein Fig. 2a and Fig. 2b are to be joined together to present a complete schematic diagram, Fig. 3 is a schematic diagram of the staircase wave form generator apparatus of the invention, Fig. 4 is a schematic diagram of the thyratron ring counter and gating circuit apparatus, Fig. 5 is a schematic representation of the master pulse generator apparatus, Fig. 6 is a schematic diagram of the slow sweep generator and variable width trigger pulser of the instant invention, Fig. 7 is a schematic diagram of the regulated high voltage radio frequency power supply apparatus in the preferred embodiment of the instant invention, Fig. 8a is a diagrammatic representation of the face of the cathode ray tube in the absence of the target signal, and Fig. 8b is a diagrammatic representation of the face of the cathode ray tube as seen by a visual observer in the presence of target signals with the gear in operation, and showing an 8-line presentation.

The terms "control grid," "screen grid" and "suppressor grid" as used herein refer to control electrode, screen electrode and suppressor electrode respectively and the term "plate" in accordance with common laboratory usage is used as synonomous with electron tube anode or collector electrode. The term "thyratron" is used with the meaning of a hot-cathode, gas-discharge tube in which one or more electrodes are used to control electrostatically the starting of a uni-directional flow of current and include triodes and tetrodes.

Referring to the drawings and more particularly referring to the block diagram illustrated in Fig. 1 of the drawings, a free running slow sweep time base generator generates a saw tooth voltage wave form for a sweep, the start of the sweep being fed to a one-kick multivibrator and thence to the keying relay coils of a conventional transmitting means to synchronize transmitter pulses with the start of the sweep. Output of the slow sweep time base generator is simultaneously fed into a push-pull amplifier to amplify the saw tooth wave form and to develop a positive wave and a negative wave. The output of the push-pull amplifier is fed to the horizontal deflection plates to produce horizontal deflection of the beam of electrons on the face of the tube for a sweep or time reference base.

The showing in Fig. 1 depicts a conventional receiver means, the signal source for which is obtained from a plurality of peripherally disposed stationary, directional receiving antennas, or other receiving devices, each subtending a sector of search. Since an octonary number of these devices are shown in Fig. 1, a 45° sector is necessarily subtended by each, collectively providing in this manner omnidirectional coverage in the illustrated target detection system. The target signals uniquely associated with each sector receiving antenna are applied to the respective input circuits of a corresponding number of pentode gate amplifier stages, each of which is rendered sequentially receptive to the target signals for a predetermined time duration.

A 400 cycle master pulse generator generates trigger pulses which are simultaneously fed to a staircase wave form generator and to a thyratron counter. The staircase wave form generator produces a multi-step (in the instant illustrative embodiment an eight-step) staircase wave form in the output side as illustrated in the block diagram. The staircase wave form is fed into a push-pull amplifier where an amplified positive staircase wave form and an output negative staircase wave form are produced. The positive wave form is applied to the upper deflection plate of the cathode ray tube and the negative wave form is applied to the lower deflection plate of the cathode ray tube to produce an eight line display. As indicated heretofore the eight steps on the cathode ray tube face are swept by means of the saw-tooth wave generated in the slow sweep time base generator. Simultaneously, the 400 cycle master pulse generator output is fed into the thyratron ring-of-eight counter as described to trigger that circuit. With the starter button in closed position the thyratron counter is set into operation. The 400 cycle pulses are fed into the thyratron tubes. Output of the thyratrons is fed into the respective pentode gates. A pulse from the 400 cycle master pulse generator serves to fire the first thyratron. During firing of the first thyratron, firing of thyratron number 1 primes or conditions thyratron number 2. Thereupon, ionization of thyratron number 2 primes thyratron number 3 and so on until all eight thyratrons have been successively fired. The trigger voltage from the 400 cycle master pulse generator plus the unbiasing produced by a thyratron, next preceding the thyratron to be fired, will cause the respective thyratron to fire. In that manner a 50 pulse per second frequency from an individual thyratron unblocks its respective pentode gate. Firing of each thyratron in turn extinguishes the firing of the thyratron in the ring-of-eight counter next preceding the firing thyratron.

The first thyratron generates an output pulse which is fed into the staircase wave form generator to synchronize that circuit with the firing of the first thyratron. The pulse from the first thyratron, fed into the staircase wave form generator, fires the thyratron in the staircase wave form generator circuit causing the staircase wave form to end at the correct period and fly-back of this wave form to result. The pentode gates are normally blocked, and are unblocked by firing of their respective thyratrons. A signal may therefore be amplified in the pentode gate only during the period in which it is unblocked by its respective thyratron. Since the staircase wave form produced in the staircase wave form generator is synchronized with the firing of the thyratrons and the pentode gates are unblocked in synchronization with the firing of their respective thyratrons, a signal introduced will therefore appear on the proper step of the staircase wave form. Output amplified signals introduced during unblocking periods into the pentode gates are fed to the push-pull amplifier following the staircase wave form generator. From the push-pull amplifier these signals are fed to a vertical deflection plate of the cathode ray tube causing a vertical line to appear in the presence of target signals. The signals are simultaneously fed to the cathode of the cathode ray tube causing intensity modulation of that tube in the presence of a signal. This produces a bright pip in the presence of a target signal on the correct line and at the proper sweep position on the face of the cathode ray tube.

A novel high voltage power supply system to be described later is used to supply voltage to the cathode ray tube and a conventional separate power supply supplies power to other components and units of the system.

A potentiometer R807 attached to the second anode of the cathode ray tube provides for astigmatic control. Potentiometer R806 provides vertical centering. A potentiometer R804 provides focus control. Brightness control is provided by potentiometer R802 in the grid circuit of the cathode ray tube. Resistors R803 and R805 provide bleeder voltage in the power supply to the cathode ray tube.

By way of further definition it is to be noted at this point in accordance with conventional terminology the letters R. F. are used herein to designate the term "radio frequency" and the legend R. C. refers to "resistance-capacitance."

The staircase wave form generator is shown more particularly in Fig. 3 of the drawings. Pulses from the 400 pulse per second (p. p. s.) master pulse generator are fed through capacitor C302 and C301 placing voltage on the cathode of V5a and on the plate or anode of V5b. Action occurs as follows: A single pip causes a positive voltage to be impressed on the plate of V5b and electron current flow results through resistor R301 and through the path presented by V5b, the path continuing through V5a and applying a negative voltage at the cathode of thyratron or gas discharge tube V6. A single pip builds up the voltage on capacitor C304 to the first step of a staircase wave form. Capacitor C301 and C302 provide adjustable voltage input of the individual input triggers. Capacitors C304 and C305 act as a voltage divider, output being taken between their junction points. A second triggering pip causes additional electron current flow through R301 and the tubes V5b and V5a, causing capacitor C304 to charge up to the second step on the staircase wave form. Successive incoming triggers build up a series of steps until eight steps are reached on the staircase wave form output. At this time a positive synchronizing pulse from the first thyratron in the counter is introduced through coupling capacitor C306, the voltage being developed across resistor R303, causing the thyratron to fire. The output wave form voltage receives its fly-back period due to the discharge of capacitor C305 through V6. R302 in the plate provides plate load resistance. Capacitor C303 and resistor R301 are a R. C. (resistance-capacitance) network to develop a variable voltage on the cathode of V5b in order to provide a constant voltage between each of the steps. Capacitor C307 maintains a 210 volt positive voltage on the plate during non-firing periods and keeps the voltage amplitude constant on the plate during firing time. The staircase wave form developed in thyratron V6 is fed to the grid of V7a which acts as one half of a push-pull amplifier, V7b providing the other half. Resistor R307 in the cathode of V7a and R309 in the cathode of V7b provide bias voltages. Grid resistance for stage V7a is provided by resistor R304, a very large grid to ground resistor. The negative staircase wave is amplified through V7a and tapped off a potentiometer R306 in the plate circuit of V7a. The signal is coupled through capacitor C307a and fed directly to the vertical deflection plate. A negative staircase wave form to be fed to a vertical deflection plate is provided as follows. The voltage coupled through C307a is developed across resistor R310 and impressed upon the grid of V7b. R310 and R311 act as a voltage divider to prevent overloading of V7b. Amplification of this signal occurs through V7b and is fed through capacitor C309 to the other vertical deflection plate. Resistance R308 provides a plate load. The positive wave form output is applied through a capacitor C307a to one vertical deflection plate and the negative wave form output is applied through capacitor C309 to the other vertical deflection plate. Target signals where present are fed through the respective pentode gate and through the common gate output bus and are coupled into amplifier V7b through capacitor C610. R627 and R311 form a voltage divider, the input signal voltage being attenuated through R627 and developed across R311 where it is amplified through V7b. This shows up as a rising tread on the staircase or vertical deflection of one of the eight spots.

The thyratron ring counter and gating circuits are best shown in Fig. 4 of the drawings. Incoming trigger pulses are fed in from the 400 cycle master pulse generator, the signal coming in from stage V9b in the master pulse generator circuit. The incoming signal pulse is coupled through capacitor C702 and appears on the grid of the first thyratron V18. With the starter button SW701 in closed position, the grid of thyratron or gas-discharge tube V18 is grounded and a minus 70 volt bias from the minus 130 volt supply through resistor R702 is momentarily removed. The incoming trigger pulse then causes tube V18 to fire. During firing of tube V18, a flow of electron current from ground through cathode resistor R703 occurs and the left hand side of capacitor C703 assumes the positive voltage developed across resistor R703. Momentary electron flow results through resistor R706 rendering the cathode of V19 more negative with respect to its grid and thus reducing the bias on that tube. This reduction in bias primes the grid of thyratron V19 only. The second triggering pulse from the master pulse generator is then impressed upon the grid of tube V19 causing the bias to be lowered sufficiently past the priming point to fire thyratron V19. The plate load of 2200 ohms R900 causes the plate voltage of thyratron V18 to momentarily go below the cathode voltage. This cuts off firing of thyratron V18 and its grid assumes control with the negative 70 volt bias. It is to be noted that the switch S701 is depressed only momentarily so that after release minus 70 volts will take over during the thyratron counter action. Firing of tube V19 causes electron flow through resistor R706 in the cathode of that tube. This causes capacitor C705 to become charged through R708 so that a negative voltage appears at the cathode of V20. This negative voltage reduces the bias so as to apply a priming voltage. A third incoming trigger pulse is coupled through capacitor C706 to the grid of thyratron V20. This trigger voltage causes the primed tube V20, only, to fire and thyratron V19 is cut off in a manner similar to the cutting off of thyratron V18 when tube V19 fires. Successive tubes are fired in the same manner and a 50 cycle per second firing frequency or sampling rate is achieved by virtue of the 400 cycle trigger pulses spread over the ring-of-eight thyratron counters. Resistors R704, R705 and R703 form a voltage divider leading from the negative 130 volt supply and are tied to ground at the other end. This insures minus 70 volts normal voltage at the grids of the thyratron tubes to keep the tubes cut off except during both priming plus trigger voltage conditions. Successive thyratron stages have corresponding bleeder resistance and corresponding parts as shown. Stages V10, V11, V12, V13, V14, V15, V16 and V17 are a series of pentode gates for their respective thyratron counters, V10 corresponding to V18, V11 corresponding to V19, etc. A suppressor grid bias of approximately minus 75 volts is normally applied to each of the pentode gate tubes from a negative 75 volt source. During firing time of any of the thyratrons V18, V19, V20, V21, V22, V23, V24 or V25, the positive voltage developed across the respective thyratron cathode resistor is coupled through the respective coupling capacitor as C601, C602, C603, etc. to overcome the minus 75 volt bias normally on the pentode gate suppressor. For example, let us consider thyratron V18 and respective pentode gate amplifier V10. The suppressor of pentode gate V10 receives the negative 75 volts through comparatively large value resistors R602 and R603, respectively. When thyratron V18 fires, the voltage developed across resistor R703 appears at the cathode of tube V18, and is coupled through capacitor C601 to unblock the negative 75 volt suppressor grid bias of pentode gate V10. The pentode gate tubes are normally biased to cut-off at the control grids through rheostats R601, R604, R607, R610, R613, R616, R619 and R622. Cutoff, class C bias is applied to any of the pentode gates as, for example, to tube V10, the bias coming from the bleeder between the negative 130 volt source and ground consisting of resistor R644 and potentiometer R645. The sliding arm contact on potentiometer R645 is joined to the connected resistance end of the respective variable grid resistor or rheostat (in the case of V10 this rheostat is R601). In the absence of a signal, there is no current flow through the pentode gate potentiometer and the grid voltage will therefore be the same as that at the sliding arm contact of potentiometer R645, the tube thus being biased to cut-off point. On initiation of a target signal the target signal is transmitted through a capacitor as C612 and developed across the grid resistance, such as R601 in tube V10, to permit conduction to take place. This signal can only go through its respective pentode gate amplifier during the time that a thyratron is firing to unblock the respective pentode gate tube at the suppressor grid. Screen voltage is applied to the screen grids of the respective gate tubes from the 150 volt power supply source and through dropping resistor R625. Plate voltage is applied from the 150 volt power supply D. C. source through dropping resistor R626 to apply proper plate voltage on each of the pentode gate tubes. The target signals are taken from the pentode gate plate side of resistor R626; they modulate the intensity at the cathode of the cathode ray tube and are also fed into the push-pull amplifier following the staircase wave the cathode of the cathode ray tube and are also fed through capacitor C610 across the voltage divider formed by resistance R627 and R311 of tube V7b in the push-pull amplifier of the staircase wave form generator circuit. For example, minus 75 volts suppressor voltage normally cuts off tube V10 and is applied from the negative 75 volt source through comparatively large value resistors R602 and R603. As stated hereinbefore, lower current through resistor R703 when thyratron tube V18 is firing will temporarily apply a positive or less negative voltage at the suppressor grid of the pentode gate during firing of this thyratron. Tube V10 has been biased beyond cut-off from the bleeder circuit between the negative 130 volts supply and ground. On initiation of a signal during the period that the suppressor grid is not blocked, that is while tube V18 is firing, the input voltage passed in through capacitor C612 is developed across potentiometer R601 allowing tube V10 to conduct. This signal is amplified in tube V10 and fed through the common pentode gate output to the cathode ray tube cathode and to the push-pull amplifier of the staircase wave form generator as described hereinbefore. C609 is a by-pass capacitor, by-passing high frequencies from the screens to ground.

The master pulse generator comprises a transatron relaxation oscillator, a triode amplifier, and a cathode follower. The circuit is best shown in Fig. 5 of the drawings.

The mechanism of operation of the transatron relaxation oscillator V8 is as follows:

Triggering from the higher to the lower value of screen current causes an abrupt rise of screen voltage as a result of decreased voltage drop in resistor R505. Because the voltage across capacitor C502 cannot change instantaneously, there is an initial change of suppressor voltage equal to that in screen voltage. The decreased negative or more positive suppressor voltage maintains the lower screen current, but a charging current starts flowing into capacitor C502 through R502, a resistor of relatively large value, and resistor R501. The charge path continues from capacitor C502 through resistor R505 to the plus 210 volt source. As the voltage across the condenser or capacitor C502 rises, the suppressor voltage becomes more negative and finally reaches a critical value at which the circuit triggers back to a higher value of screen current. The resultant abrupt fall of screen and suppressor voltage is immediately followed by dicharging of condenser C502 and an exponential rise of suppressor voltage occurs until the circuit again triggers. It may be readily seen therefore, that capacitor C502 provides a feed back path from the screen to the suppressor grid. Resistor R501 and potentiometer R502 together with cathode resistor R503 provide a charging path for condensor C502, the path passing through the screen to cathode resistance and back to the capacitor C502. The plate load is developed across resistance R504. Capacitor C501 provides a high frequency RF by-pass to ground from the plate and C504 provides a high frequency by-pass from B+ to ground. C503 is a smoothing capacitor. The output of stage V8 is a crude negative pulse and this output is differentiated to a sharp negative pulse across capacitor C505 and resistor R506, a differentiating circuit. The pulse is amplified by triode amplifier V9a, output load being developed across resistor R507. The positive pulse at the plate V9a is coupled through capacitor C506 to the grid of V9b, a cathode follower. The input trigger pulse to V9b is developed across grid resistor R508. Two outputs are taken from the cathode follower. A first output at the cathode produces 400 pulse per second (p. p. s.) frequency pulses to the staircase generator to trigger the staircase wave circuit. Potentiometer R509 is tapped to provide a lower level voltage 400 pulse per second triggering voltage to the ring-of-eight thyratron counter. Operation of the ring-of-eight thyratron counter in response to these pulses has been described heretofore. The plate of V9b is connected to a positive 320 volt, voltage source in order that the high voltage (approximately 200 volts) of pips fed to the staircase generator may be produced in this tube. The negative input pulse at the grid of tube V9a is about 15 volts in amplitude.

The slow sweep generator and variable width pulser circuits are best shown in Fig. 6 of the drawings.

Referring to Fig. 6, the slow-sweep generator is a phantastron type circuit employing a relaxation oscillator generating a linear timing wave form (saw tooth) by means of a "Miller sweep generator." The screen coupled phantastron is astable or free running. An associated cathode follower V2a is provided for rapid low-resistance recharging for timing capacitor C202. Action of the relaxation oscillator can be described as follows: Assume a point in operation at which sufficient suppressor bias is applied in tube V1 to cause plate current cut-off; in this condition the plate is held at about plus 120 volts by a voltage divider comprising resistors R204 and R205. The cathode of V1 is grounded and the grid is held slightly positive by the current flowing in resistor R209. Because of plate current cut-off the screen is held at a low potential since it is taking the current which would normally flow to the plate. By a regenerative process to be described, plate current begins to increase, causing plate voltage to fall; the grid and consequently the cathode of the charging cathode follower V2 fall correspondingly. Capacitor C202 is a comparatively large capacitance capacitor which does not discharge immediately, therefore, this impulse is coupled to the grid of V1 as a negative bias, thus greatly reducing screen current of V1. This causes the screen voltage to rise. As suppressor voltage of V1 is determined by the voltage appearing across the divider R203, R202 and R201, the suppressor voltage is simultaneously raised and plate current flows to the extent that the plate load will permit. Since cathode current of a pentode is fairly constant, any increase in plate current must decrease the screen current since the current flowing through the tube will be substantially constant. As will be explained this action is regenerative and causes plate current to increase rapidly. Increasing plate current causes a resultant drop in plate voltage which is transferred to the grid of V1 by means of action of the cathode follower V2a. It may be noted at this point that the grid of V2a is tied to the plate of the relaxation oscillator V1. Thus, a drop in voltage on the plate of V1 is immediately reflected on the grid of V2a causing the cathode current to fall appreciably thus resulting in a lowered voltage at the cathode of V2a. In view of the fact that capacitor C202 is of comparatively large value it cannot charge or discharge immediately. The lower voltage at the cathode of tube V2a therefore appears almost immediately on the grid of tube V1. With the circuit constants used in this circuit this initial fall is limited to about 5 volts by feed-back between plate and grid. When the grid is carried below cathode potential to about minus 5 volts, two effects take place; one, the total plate and screen current of tube V1 is reduced to a very small value and two, the grid no longer takes the current flowing in timing resistor R209. This current can now only flow in timing capacitor C202. As one end of resistor R209 is held at constant voltage by sweep control R207, R208 and the switching means, the voltage drop across R209 and consequently the discharge current of capacitor C202 will depend on the grid voltage of the pentode V1. If desired, a switch may be inserted in place of the resistance R207, R208 and the switch installed for proper adjustment of the sweep time. Any tendency of the grid of relaxation oscillator V1 to change causes a corresponding plate current change in that stage and is counteracted by an opposing voltage coupled back to the grid of V1 from the plate of V1 by cathode follower V2a and timing capacitor C202, such action occurring because the plate of tube V1 is tied to the grid of tube V2a and changes being reflected by cathode current in tube V2a, the change in voltage passing through capacitor C202. The reduced voltage at the cathode of cathode follower V2a appears at the grid of tube V1 through capacitor C202. Thus a state of equilibrium is maintained holding the grid potential of tube V1 nearly constant. C202, the timing capacitor begins to discharge, the grid of V1 then rises slightly in voltage, permitting the increased plate current through oscillator V1 which is necessary to cause the plate voltage of tube V1 and the cathode voltage of cathode follower V2 to fall correspondingly. Since the grid of tube V1 needs to change less than a volt to cause the entire plate swing of V1, the voltage across the timing resistor R209 and therefore the current through it remains practically constant during the sweep. This constant current discharging the timing capacitor C202 thus causes a linear change in voltage across the timing capacitor C202. Since the grid end of the timing capacitor C202 changes very little (less than 1 volt) the other end of C202 at the cathode of V2a falls in a linear saw tooth. The plate voltage is reduced to such a low voltage ("bottoms") that it runs into the "knee" of the plate current curve. In this condition, the plate can no longer hold the grid down and the total current begins to rise. Since the plate can take no more load current, the increased current goes to the screen of oscillator V1 which therefore begins to drop in voltage. The screen-suppressor coupling through capacitor C201 carries the suppressor down with the screen voltage, thus decreasing the plate component of the total current since the fall in suppressor voltage turns back the plate component of the total current. This regenerative action rapidly cuts the plate current of tube V1 off because of the suppressor bias on tube V1 and leaves the circuit in the initial condition, that is with the grid of tube V1 taking charging current (formerly flowing in the timing capacitor C202) and with the screen at low voltage and the plate held at constant voltage by voltage divider R205 and R204. Resistors R201, R202 and R203 leading from the 210 volt voltage supply to ground from a voltage divider for screen and suppressor grid voltage. Resistance R206 forms a voltage divider circuit with R210 and R211 for the grid of stage V4b in a manner to be described. In addition R206 presents an additional discharge path for capacitor C202. In the cathode follower V2a, resistance R212 as hereinbefore described transmits tube current to place proper voltages at the cathode of V2a for action of the relaxation oscillator. A potentiometer R213 in the cathode circuit provides sweep length control.

Output of the cathode follower V2a is a negatively sloped saw tooth wave taken between the contact arm of potentiometer R213 and ground. Action occurs as follows: When the screen current of relaxation oscillator V1 is large a negative suppressor bias is almost instantaneously set up by means of resistor R202 and capacitor C201. This causes plate current to be cut off at a very rapid rate causing the plate voltage at tube V1 to rise to a maximum. This voltage is transmitted to the grid of V2a the cathode follower, and consequently to the cathode of cathode follower V2a. Phantastron diode action of the V1 tube follows, the charging path of C202 occurring from cathode of tube V1 to its grid then through capacitor C202 and to the cathode of cathode follower V2a thence to the plate of tube V2a and through the power supply back to the cathode tube of tube V1. Since the capacitor charging current path is through the cathode follower V2a, this feature reduces the sweep fly-back time to a minimum due to low circuit resistance. The range switch (not numbered) leading to either resistance R207 or R208 or the junction point between them may permit adjustment of sweep time at either 1.5, 3.0, or 4.5 seconds. The negative slope saw tooth wave form generated at the potentiometer arm of potentiometer R213 of the cathode follower V2a is transmitted directly to the grid of stage V4a, one-half of a push-pull amplifier. The positive sloping saw tooth wave form developed at the contact arm of potentiometer R211 is fed to the grid of V4b, the other half of the push-pull amplifier circuit for the saw tooth generator. A common cathode resistance R216 carries current through these tubes. Inasmuch as the wave form impressed on the grid of V4a occurs about 180° out of phase with the wave form impressed on the grid of B4b, the common resistor may be used. Resistor R216 provides bias of the push-pull amplifier at the correct value. Plate loads are developed across R214, the resistor in the plate circuit of V4a, and R215, the resistor in the plate circuit of V4b. Outputs of stages V4a and V4b are fed directly to the horizontal deflection plates of the cathode ray tube V101 to produce the horizontal sweep. The slow sweep saw tooth wave form is fed from the cathode of V2a, the cathode follower, and coupled through capacitor C101 to a variable width trigger pulser. The variable width trigger pulser circuit employs a negative diode clamp V2b and a cathode coupled one-kick multivibrator comprising stages V3a and V3b. As stated the input to the circuit is the slow sweep saw tooth wave form coupled through capacitor C101 and taken from the cathode of the cathode follower V2a. In the fly-back time the positive pulse developed sets the one-kick multivibrator V3a and V3b into action to trigger the output pulse. The diode clamp V2b serves to isolate the phantastron circuit from the multivibrator and eliminates a negative transient from interfering with the one-kick multivibrator. The one-kick multivibrator operates as follows: Assume stage V3a is cut off initially and stage V3b is conducting heavily; voltage drop across the cathode resistor R104 biases V3a to cut-off point. In this condition since resistors R106 and R107 or R108 comprise a very high resistance value, practically no current flows therethrough and the grid is at cathode potential. On receiving the positive trigger pulse derived from the flyback time and coupled through capacitor C101 stage V2b conducts causing relatively high current flow from ground through resistor R102 and through the diode clamp V2b. This generates a positive voltage at the grid of V3a, current simultaneously going through R101 to provide a closed circuit through V2b and R101 to ground and from ground through resistance R102 and through the diode clamup V2b. The positive voltage developed across resistance R102 by flow of current therethrough applies a voltage at the grid of stage V3a above its cut-off voltage. This causes stage V3a to begin to conduct and the voltage at its plate is decreased. This decrease passes through capacitor C102 since the voltage across the capacitor cannot be changed instantaneously and appears on the grid of stage V3b as a dropping voltage. The plate current of stage V3b then decreases and the voltage drop across the cathode resistor R104 decreases with tube current decrease, lowering the bias of stage V3a and permitting more current to flow through V3a. The higher plate current through V3a then further decreases the plate voltage at the plate of V3a. This causes the grid of V3b to go still more negative. This regenerative action is repeated until V3b is cut-off and V3a is conducting. The action is practically instantaneous. With V3a conducting and V3b cut-off, capacitor C102 discharges through resistor R106 and either resistor R108 and/or R107 if connected in the circuit (that is through the contact arm to the cathode of V3a) and through tube V3a to the other side of capacitor C102. Flow of electrons through R106 decreases exponentially until the flow of electrons through resistor R106 is sufficiently low so that the voltage at the grid of V3b is at cut-off. Still further decrease of discharge current of capacitor C102 causes tube V3b to rise above cut-off voltage and V3b starts to conduct. The plate current of V3b flowing through cathode resistor R104 raises the cathode voltage of V3a thus reducing its plate current. The decrease in plate current of V3a allows the plate voltage of V3a to increase. This increase is coupled through capacitor C102 to the grid of V3b increasing still further its plate current. This action is repeated and regeneration continues until V3a is cut off and V3b is conducting heavily. This action is also practically instantaneous. The circuit is now back in its original balanced state and will remain so until another positive trigger pulse from the fly-back period passing through coupling capacitor C101 arrives and causes V3a to conduct. Cutting off of V3b by the fly-back time pulse of the saw tooth wave gives a positive pulse through relay coil K1 by virtue of the decrease in plate current through V3b. The pulse energizes relay K1 causing the armature of contact K11 to be placed in the ground position thus grounding a relay in a pulser circuit allowing the pulser circuit to start operation. The pulser circuit may be a transmitter or other type of generator. In the one-kick multivibrator circuit resistor R103 forms the plate load of V3a. Resistors R107 and R108 and the armature of the switch therein which make contact either shorting the combination or with the junction point between R107 and R108 or with R108 and R107 in series regulates the length of the pulse width fed to energize relay K1. This regulates the amount of time of grounding of relay contact K11 thus regulating the level of energy put out of the transmitter of pulser circuit to be synchronized with the receiver of the present invention.

The new and improved regulated high voltage power supply of the instant invention is best shown in Fig. 7 of the drawings. As shown in that figure the high voltage power supply employs an R. F. (radio frequency) oscillator V29 which may be operated at about 235 kilocycles per second. With safety interlock switch S902 in closed position, plus 320 volts are applied to the plate of V29, the oscillator, through resistance R402 and the primary coil of transformer T401. The suppressor grid of tube V29 is tied to its cathode in accordance with conventional practice. Transformer T401 in the plate circuit of V29 permits output to be delivered to the high voltage power supply through the positive pulses produced at the plate of V29, the R. F. oscillator. Primary pulses across the primary of T401 shock the secondary of T401 into oscillations which provide an R. F. frequency for rectification. A tickler winding shown at the top of the transformer together with capacitor C401 provides positive feed back to the grid of oscillator V29. The grid of oscillator V29 is provided with a grid resistor R401 and capacitor C402 to permit the grid to be operated at class C.

The frequency of oscillation is determined chiefly by the resonant frequency of the secondary winding of T401. The natural circuit capacitances that tune this winding include the distributed capacitance of the winding, the capacitance of the rectifying tubes V30 and V31 and the stray wiring capacitance. The primary winding is tuned by fixed capacitor C409 to approximate the resonant frequency of the secondary. As indicated hereinbefore, the third winding of the transformer located at the end of the secondary winding opposite from the end occupied by the primary and shown at the top of the Fig. 7 is loosely coupled to the secondary and provides good excitation for oscillator tube V29.

Filament voltage is supplied to rectifying tubes V30 and V31 by two additional single turns XZ and Y and the secondary lead coupled to the secondary winding of T401.

Half way rectification is produced as follows: On the negative swing at the filament of tube V30, tube V30 conducts through R403 and through the bleeder circuit comprising resistors R405, R404, R406, potentiometer R407 and resistor R408 to ground. Filtering action is provided by filter resistor R403 and capacitors C404 and C405.

Half way rectification is provided on the positive swing by conduction of tube V31 through the cathode ray tube to ground. The path of electron flow comes from ground through the cathode of the cathode ray tube, to the intensifier ring, thence to the filament of V31, through the secondary of T401 and back to ground. C406 is a filter capacitor. In this manner positive 1500 volts and negative 1500 volts are provided for cathode ray tube operation. The stabilizing circuit for controlling the screen current of oscillator V29 is provided by inverter V33b, pentode difference amplifier V32 and a cathode follower V33a in series with the screen grid of oscillator V29. A portion of the output voltage from the high voltage negative supply is tapped from potentiometer R407 in the high voltage negative supply bleeder, is impressed on the grid of V33b and compared with a constant regulated minus 75 volts on the cathode of triode inverter V33b. The plate load of V33b is developed across R410 and C408 provides high frequency by-pass. The inverted output at the plate of V33b is applied to the grid of the pentode difference amplifier V32. Plate voltage to tube V32 is provided from the 320 volt supply through interlock S902 and through plate load resistor R409 to the plate of that tube. Screen and plate of V32 are tied to each other and suppressor and cathode of V32 are tied to each other. The output of inverter V33b appears on the grid of pentode difference amplifier V32 and is compared with a constant plus 75 volts on the cathode of pentode difference amplifier V32. Output is taken from the plate of pentode difference amplifier V32 and applied to the grid of cathode follower V33a. The plate of V33a is tied directly through interlock S902 to the 320 volt power supply. Screen current of oscillator V29 must pass through cathode follower V33a before it reaches the B+ supply.

Should the load across the high voltage power supply increase, a lower voltage at the contact arm of potentiometer R407 will be transmitted at the grid of inverter V33b. This will result in a lowered current flow through V33b causing the plate voltage at that tube to go up. The rise in plate voltage will be transmitted to tube V32 causing that tube to increase conduction. Increased current flow through tube V32 will cause a lowered plate voltage at that tube. This lowered plate voltage will be transmitted to the grid of V33a causing current in that tube to decrease. This will result in a lowered screen current from oscillator V29 thereby increasing the screen voltage at that tube. This will result in higher amplitude oscillations at the primary of T401. The higher oscillations will be reflected in the secondary of T401 causing increased voltage across the bleeder comprising resistance R404, R405, R406, potentiometer R407 and resistor R408, the voltage at the contact arm of R407 will then go up to its regulated point. A reduced load on the high negative voltage supply will cause a higher voltage to appear on the contact arm of potentiometer R407. This higher voltage will be transmitted through the stabilizing circuit to again bring the voltage on the contact arm of R407 back to its regulated voltage.

THEORETICAL DISCUSSION

The described system has presented a feasible display system for giving target range and indication of presence of target as shown in the block diagram, Fig. 1. This system may be used with a non-rotating eight transmission or antenna directional receiving means and can employ electronic commutation for proper sequential sampling of each channel. The eight antennas or other sending and receiving devices may be equally spaced at intervals of 45° to cover sectors representing that angular direction of possible target signals.

The staircase waveform generator circuit described has been used to deflect the beam of a single gun 5 inch electrostatic cathode ray tube (for example) in the vertical. By sweeping the electron beam horizontally across the face of the cathode ray tube at a succession of eight vertical levels, each of the eight directional antennas or other transmitting and/or receiving signal devices can be represented. Eight channel commutation is accomplished with the thyratron counter as described and by means of coincidence voltages to the suppressor and control grids of the gating tubes, signals are presented as deflection and intensity modulation on the linear time base.

To obtain a fifty cycle per second sampling rate, the master pulse generator supplies positive pulses at a 400 cycle per second repetition rate. These pulses trigger the ring-of-eight counter every 2.5 milliseconds and also charge up the energy storage counter (staircase wave form generator) every 2.5 milliseconds. By using a thyratron output pulse from the ring-of-eight counter to trigger the thyratron switch in the staircase wave form generator, synchronization is maintained.

As has been shown, a radio frequency high voltage power supply is used for the cathode ray tube V101 to supply power with good regulation at varying load conditions i. e. brightness control setting.

The full schematic diagram of the entire illustrative embodiment eight-line cathode ray tube target display indicator is presented in Figs. 2a and 2b.

In normal operation the fly back time period of a free running slow sweep time base generator triggers a one-kick multivibrator to transmit pulses from the antenna or other sending and receiving signal means of the display apparatus. The saw tooth wave form of the slow sweep time base generator is simultaneously fed into a push-pull amplifier, the output of which is applied to the horizontal deflection plates of a cathode ray tube V101. This action produces a linear horizontal sweep across the face of the cathode ray tube. Pressing the starter button SW701 causes the 400 cycle master pulse generator to operate the ring-of-eight thyratron counter whereby progressive firing of the eight thyratrons takes place. The firing frequency of each thyratron circuit in the ring counter is 50 cycles per second. The pulse at the cathode output of each thyratron is fed into its respective pentode gate. The output of the first thyratron introduces a synchronized pulse to a staircase wave form generator. The staircase wave is amplified in a push-pull amplifier, the positive portions of the wave being applied to the upper deflection plate and the negative portions of the wave being applied to the lower deflection plate of the cathode ray tube V101. In that manner, eight different voltages cause eight separate electron beams to be projected on the cathode ray tube. That is, each step of the staircase wave generator output provides a separate voltage to the vertical deflection plates, thereby permitting eight separate vertical positioned beams. The slow sweep time base generator output causes horizontal deflection of the eight beams, thus providing a synchronized eight line scan.

Power is applied by means of a positive 1500 volt high voltage power supply and a negative 1500 volt high voltage power supply. Voltages to the anodes, grid, and cathode of the cathode ray tube V101 are tapped off a voltage divider in parallel with the negative portion of the power supply. Conventional astigmatic, focus and intensity voltages are applied by means of potentiometer controls.

Signals received at any of the eight sector antennas or other receiving devices are fed to their respective pentode gate tubes. These signals are amplified in the respective pentode gates. The plate current flow thus caused lowers the plate voltage of the respective pentode gate tubes. This drop in voltage or deflection modulation is fed in the push-pull amplifier which follows the staircase wave form generator. After being amplified in the push-pull amplifier, the amplified signals are fed to the vertical deflection plates of the cathode ray tube. These applied voltages cause pips to appear on the cathode ray tube in the horizontal position corresponding to the range of the target from whence the signal is derived. Inasmuch as the staircase wave form generator has been synchronized with the firing of the first thyratron, the distance from the left side of the appropriate scan line is a measure of the range. The details of operation of the staircase wave form generator, slow sweep generator, pulse generator, thyratron ring counter and gating circuits, transmitter pulse generator, regulated R. F. high voltage power supply and allied circuits are theoretically described below.

*Staircase wave form generator*

The staircase wave form generator shown in Fig. 3 of the drawings operates on an energy storage principle in which a staircase wave form is developed across the energy storage element, a capacitor C304, which may be a .0015 microfarad capacitor in the cathode circuit of the thyratron switch V6. By amplitude comparison, i. e. generation of negative steps on the cathode of the thyratron V6 by the incoming triggers until the critical firing voltage of the tube is reached, an electronic switch, the thyratron, discharges the capacitor to "zero" level. This counting sequence is then repeated to give a staircase wave form. A staircase amplifier provides a balanced push-pull wave form required to deflect the beam vertically across the screen as eight finite spots arranged at eight different vertical levels on the cathode ray tube. A small capacitor C302 (which may be an eighty $\mu\mu f$.) parallelled by a variable ceramic (ten to 100 $\mu\mu f$.) C301 has as its purpose the addition of energy to the energy storage capacitors C304 and C305. C305 may be a .01 $\mu f$. capacitor. Capacitors C304 and C305 are at the cathode of the thyratron switch V6. C307 may be a .0015 $\mu f$. capacitor on the plate of the switch and leading to ground. The 400 pulses per second from the pulse generator are approximately 200 volts in amplitude and 20 to 30 microseconds in pulse width. The positive rise of voltage across capacitors C304 and C305 is approximately equal to plus 100 volts. Negative steps are generated on the cathode by the 400 pulse per second pulses until the critical firing point of the tube is reached. After the recycling switch is operated, the initial share of value of voltage on capacitors C304 and C305 is determined by the charge-sharing action of C304, C305 and C307 in the electronic switch.

If the potential at the cathode of tube V5b were clamped, the negative steps would fall in amplitude exponentially according to the equation $$n - 1 \Delta E_n = [E_c + (E_A - E_{n-1})] \frac{C_1}{C_1 + C_2} \quad (1)$$

where $E_c$ is the amplitude of the trigger pulse and $E_A$ is a fixed positive potential. Steps of equal amplitude can be generated by shifting the value of $E_A$ convex downwards with the appearance of each trigger pulse. By means of a resistance-capacitance (R. C.) circuit on the cathode of tube V5b, a falling saw tooth is generated at this point during the staircase time. This makes $E_A \cong E_{n-1}$ so that Equation 1 becomes:

$$n - 1 \Delta E_n \cong E_c \frac{C_1}{C_1 + C_2} \quad (2)$$

During the generation of negative steps at the cathode of thyratron V6, capacitor C307 has charged up to 210 volts through the 50,000 ohm plate resistor R302 in 75 microseconds. When the bias on the thyratron V6 has been stepped down to firing potential, capacitors C304 and C305 rise up to 100 volts, and capacitor C307 drops 100 volts to approximately +100 volts. This action occurs after 10 or so negative steps before it repeats itself. However, a synchronizing positive pulse on the grid of thyratron switch V6 fires the circuit before the bias control of the cathode does. This always occurs on the eighth step and is done for synchronization purposes at 50 cycles per second.

The staircase output is taken off a capacitor voltage divider comprising C304 and C305 and fed to a balanced push-pull amplifier at very high impedance. Stage V7a gives a positive staircase wave form and inverts the wave form for stage V7b input whose wave form is a negative staircase. A 100,000 ohm potentiometer R306 in the plate of stage V7a controls the amplitude of push-pull output to the vertical plates of the cathode ray tube V101. To provide vertical deflection of the spot, the signal input from the common gate bus of the pentode gate tubes is inserted as negative variations on the grid of the tube V7b shown at the right on the drawing. This shows up as a rising tread or vertical deflection of one of the eight spots as a signal enters one channel.

*Thyratron ring counter and gating circuits*

A scale-of-eight thyratron ring counter with a cathode extinguishing circuit is employed for electronic commutation purposes as shown best in Fig. 4 of the drawings. An output positive pulse is taken from the cathode of each of the eight thyratrons (which may be 2D21 tubes) and applied to the suppressor grid of each of eight pentode gating tubes (which may be 6AS6 tubes).

The operation of this ring-of-eight thyratron step counter can best be explained by considering any two thyratron stages. Consider for example V18 and V19. Suppose V18 is firing. The IR or voltage drop resulting from the flow of current through the 10,000 ohms cathode resistor R703 accomplishes two results. It primes the grid of tube V19 by charging the 1000 micromicrofarad $\mu\mu f$.) capacitor C703, connected between the cathodes of V18 and V19 and thus the negative grid bias on tube V19 only is reduced, since the cathode becomes more positive. A positive trigger pulse will cause tube V19 only to fire since it is the only tube primed. (The negative bleeder resistor values are so chosen that a tube will not be fired by a trigger unless the tube immediately preceding it in the ring is conducting.) When thyratron V19 fires, the cathode-coupled capacitor C703 discharges through gas-discharge tube V19 and the drop across the plate resistor R900 makes the plate negative with respect to the cathode for an instant causing tube V18 to extinguish. A resistance of 2200 ohms has been found suitable for plate resistance R900. The grid of tube V18 assumes control with a bias of minus 70 volts. Now thyratron V18 will not fire again until it is primed by its preceding thyratron V25. The trigger frequency is about 400 pulses per second (p. p. s.) and each thyratron frequency is 400 divided by eight equals 50 pulses per second (p. p. s.) The gating-tube circuit operates in the following manner. The target signal either rectified or unrectified is applied to the control grid of a pentode as V10 which is biased nearly to cut-off in order to obtain freedom from pedestal. A 6AS6 pentode has been found satisfactory for the purpose. The suppressor grid is held normally at cut-off with minus 67 volts. In order for the gating tube to be turned on a 100 volt positive pulse, obtained from the ring-of-eight stepping counter, is applied to the suppressor grid and normal tube gain results. The signal applied to the control grid will then appear across the common plate load resistor R626 in proper sequence. A resistor of 15,000 ohms has been found satisfactory for plate load R626.

A high impedance input signal of approximately 1.5 volts R. M. S. (root mean square) is applied across a 1 megohm potentiometer (as R629) which acts as a master attenuator. The signal is then capacitor-coupled to the control grid of a gating tube as V10 where a grid resistor (a 500K ohm resistor can be used) is used for further vernier attenuation. By flipping a two-position switch the input signal (which may be an audio signal) may be rectified by a germanium diode such as a 1N38 and applied to the control grid of the gating pentode.

The time selected output across the common gate plate load resistor R626 is applied to the cathode ray tube in two ways: (a) to the cathode of the cathode ray tube for intensity modulation of the signal, (b) to the grid of one of the vertical push-pull amplifiers for "tread" modulation of the steps of the staircase wave form generator which appears as a vertical deflection on an appropriate line of the eight-line sweep pattern.

*Master pulse generator*

The pulse generator used to operate the ring-of-eight thyratron counter and the staircase wave form generator as shown in Fig. 5 can employ a 6AS6 miniature pentode in a transitron oscillator circuit. A one megohm rheostat on the suppressor grid, R502, allows for a variable frequency control of the transitron relaxation oscillator. The optimum operating frequency can be about 400 cycles per second.

The transitron relaxation oscillator generates crude positive pulses at the screen of the pentode at an amplitude level of 60 volts. The transitron screen output is differentiated to give a negative spike of about 15 volts. This spike may then be amplified by one-half of a 12AT7 as stage V9a. The resultant 200 volt pulse is then fed to a cathode follower (which may be stage V9b the other half of the 12AT7 tube) and a maximum pulse amplitude of about 200 volts and pulse width of 30 microseconds is applied to the staircase wave form generator. A 100 volt pulse is tapped off the 100K ohm potentiometer in the cathode R509 and applied to the thyratron counter.

The mechanism of operation of the transitron relaxation oscillator is as follows: Triggering from the higher to the lower value of screen current causes an abrupt rise of screen voltage as a result of decreased voltage drop in 25K ohms screen resistor R505. Because the voltage across the 0.002 microfarad capacitor C502 cannot change instantaneously, there is an initial change of suppressor voltage equal to the change in screen voltage. The decreased negative suppressor voltage maintains the lower screen current but a charging current starts flowing into capacitor C502 through screen resistor R505 and the approximately 1.5 megohm suppressor resistors. As the voltage across capacitor C502 rises, the suppressor voltage becomes more negative and finally reaches a critical value at which the circuit triggers back to a higher value of screen current. The resulting abrupt fall of screen and suppressor voltages is immediately followed by discharging the condenser C502 and exponential rise of suppressor voltage until the circuit again triggers.

The final output wave form is asymmetrical for the following reasons: As the suppressor swings positive, suppressor current flows. This flow of suppressor current together with decrease of screen current and resulting increase in the portion of the current through the suppressor resistor that flows into the capacitor causes the capacitor voltage to charge more rapidly than during the discharge of the capacitor when no suppressor current flows and the screen current is higher.

Hence, the time constants are:

$$T_{\text{charge}} = C\left(\frac{R_3 r_3^1}{R_3 + r_3^1} + \frac{R_2 r_2^2}{R_2 + r_2^1}\right)$$

where:

$C$=charging condenser (.002 microfarad)
$R_3$=suppressor resistor 1.5 megohm
$r_3^1$=average suppressor-cathode resistance during charging period
$R_2$=screen resistor, 25K
$r_2^1$=average screen-cathode resistance during charging period and $$T_{\text{discharge}} = C\left(R_3 + \frac{R_2 r_2}{R_2 + r_2}\right)$$

$r_2$=average screen-cathode resistance during discharging period

*The slow-sweep generator*

This phantastron type circuit (shown in Fig. 6) is a relaxation oscillator generating a linear timing wave form (saw tooth) by means of a so-called "Miller sweep generator." This circuit employs a screen-coupled phantastron in an astable or free running form. Both the turn-on and turn-off of a 6AS6 pentode tube (which may be used) are regenerative and the screen rectangle may have rise and fall times as short as 0.5 microsecond. As associated cathode follower V2a is provided for a rapid low-resistance recharging path for capacitor C202 which may be a 1.0 microfarad capacitor. The sweep amplifier provides the balanced (push-pull) wave form required to deflect the beam horizontally across the cathode ray tube screen. The balanced output maintains a constant average deflection plate potential over the entire sweep and thus prevents deforming of the spot. This amplifier may employ a type 12AU7 tube in a cathode coupled circuit. A voltage divider is provided because the 150 volt sweep generator form must be attenuated to prevent over driving the sweep amplifier.

The relaxation oscillator action can be described as follows: At some point in its operation sufficient suppressor bias is applied to cause plate current cut-off and the plate is held at about +120 volts by the voltage divider. Since the cathode is grounded, the grid is held slightly positive by the current flowing in the timing resistor and the screen is at a low potential as it is taking the current which would normally flow to the plate. By a regenerative process, plate current begins to increase, causing the plate voltage to fall; the grid and consequently the cathode of the charging cathode follower fall correspondingly. Since the timing capacitor C202 cannot discharge immediately, this impulse is coupled to the grid as a negative bias, thus greatly reducing the screen current. This causes the screen voltage to rise. As the suppressor voltage is determined by the voltage appearing across the divider, it is simultaneously raised and plate current flows to the extent that the plate load will permit. Since the cathode current in a pentode is fairly constant, any increase in plate current decreases screen current. This action is regenerative and causes plate current to increase rapidly. The resultant drop in plate voltage is transferred to the grid of V1 (which may be a 6AS6) via the cathode follower V2a and the 1.0 microfarad timing capacitor C202. With the circuit constants used in this circuit, this initial fall is limited to about five volts by feed-back between plate and grid. When the grid is carried below cathode potential (about minus 5 volts), two effects take place: (a) the total plate and screen current is reduced to a very small value and (b) the grid no longer takes the current flowing in the timing resistor. This current can now only flow in the timing capacitor C202. As one end of the timing resistor is held at constant voltage by the sweep control, the voltage drop across it and consequently the discharge current of the timing capacitor will depend on the grid voltage of the 6AS6 pentode. Any tendency for the grid to change causes a corresponding plate current change and is counteracted by an opposing voltage coupled back to the grid from the plate via the cathode follower and the timing capacitor. Thus, a state of equilibrium is maintained holding the grid potential nearly constant. As the timing capacitor discharges the grid rises slightly, permitting the increased plate current necessary to cause the phantastron plate and cathode follower cathode to fall correspondingly. Since the grid needs to change less than a volt to cause the entire plate swing, the voltage across the timing resistor and therefore the current through it remains almost constant during the sweep. This constant current, discharging the timing capacitor C202, cause a linear change in voltage across the timing capacitor. Since the grid end of the timing capacitor changes very little, the other end falls in a linear saw tooth. To get a quantitative idea of linearity, consider the following typical constants. Plate load 500K ohms, changing voltage 100 volts. For a 100 volt plate swing $$\frac{100}{500 k\Omega} = 0.2 \text{ milliamp}$$

charge or plate current change would be needed. For a transconductance ($G_m$) of a 6AS6 tube of two milliamps per volt $$\left(\frac{2 \text{ ma.}}{\text{v.}}\right)$$

this would require a 0.1 volt change. The initial charging current would therefore be only 0.1% greater than the terminal current. The right side of the timing capacitor falls at a rate of $$\frac{120+5}{R.\ C.}$$

volts per second.

When the plate reaches such a low voltage ("bottoms," i. e., runs into the "knee" of the plate curve) that it no longer can hold the grid down, the total current begins to rise. Since the plate can take no more current, the increased current goes to the screen which begins to fall in voltage. The screen-suppressor coupling carries the suppressor down, thus decreasing the plate component of the total current. This regenerative action rapidly cuts the plate current off because of suppressor bias and leaves the circuit in its initial condition, i. e., grid taking charging current (formerly flowing in the timing capacitor), screen at low voltage and plate held by the voltage divider.

By connecting the cathode follower V2a between the plate of V1 and the timing capacitor C202, very rapid recharging is possible. The plate of V1 runs rapidly since it has only the tube capacities in shunt with it. When the plate rises it carries up the grid and consequently the cathode of the cathode follower. The other side of the timing capacitor is held near ground by the diode action of the phantastron grid. Thus, the timing capacitor recharging current is supplied by the cathode follower V2a and may be large due to low circuit resistance. This feature reduces the sweep fly-back time to a minimum.

The range switch R207, R208 and the junction point therebetween, permits adjustment of sweep time at 1.5, 3.0 or 4.5 seconds.

Variable width trigger pulser

As shown to the right of Fig. 6 the circuit employs a negative diode clamp and a cathode-coupled one-kick multivibrator. The input to the circuit is the slow sweep saw tooth wave form. The output is a positive square pulse. The pulse frequency is controlled by the saw tooth generator frequency and the pulse width is variable by means of switched-in timing resistors in the multivibrator grid, that is, R107, R108 and the junction therebetween.

The diode clamp isolates the phantastron circuit from the multivibrator and eliminates a negative transient from interfering with the one-kick multivibrator. A positive trigger pulse is thus developed on the grid of V3a of the multivibrator. The one-shot multivibrator is essentially a two stage resistance-capacitance-coupled amplifier with one tube cut-off and the other normally conducting. The balanced condition of the circuit is established by the arrangement for biasing the tubes. The grid of tube V3b is connected to its cathode through a one megohm resistor R106. No current normally flows through this resistor, therefore, the grid bias is normally zero. The plate current of V3b flows through the 5K cathode resistor R104 and the resultant voltage drop across the cathode resistor R104 biases the left tube V3a to cut-off. When V3b is not conducting, V3a cannot be cut-off by the self-bias developed across the cathode resistor. The action of the circuit is as follows:

(a) V3a is cut-off initially by the voltage drop across the cathode resistor by the plate current of V3b.

(b) V3b is conducting heavily because its grid is at cathode potential.

(c) A positive trigger pulse, derived initially from the fly back pulse of the slow sweep generator, and sufficient in amplitude to raise the grid of V3a above the cut-off voltage is impressed on the grid of V3a.

(d) V3a begins to conduct and the voltage at its plate is decreased. This decrease passes through the 0.01 µf. capacitor C102 as the voltage across a capacitor cannot be changed instantaneously and appears on the grid of V3b as a negative-going voltage. The plate current of V3b decreases and the voltage drop across the cathode resistor decreases allowing more current to flow in V3a. The plate voltage of V3a is still further decreased. The grid of V3b goes still more negative. This action is repeated until V3b is cut off and V3a is conducting. The action is practically instantaneous.

(e) The circuit remains with V3a conducting and V3b cut off while the 0.01 µf. capacitor C102 discharges sufficiently toward the lowered value of plate voltage of V3a to allow the grid of V3b to rise from its lowest value to cut-off voltage.

(f) Then V3b begins to conduct. The plate current of V3b flowing through the cathode resistor raises the cathode voltage of V3a, thus reducing its plate current. The decreased plate current of V3a allows the plate voltage of V3a to increase. This increase is coupled to the grid of V3b increasing still further its plate current. This action is repeated until V3a is cut off and V3b is conducting heavily. This action is practically instantaneous.

(g) The circuit is now back in its original balanced state and will remain so until another positive trigger pulse arrives and causes V3a to conduct.

The coil of the relay K1 in the V3b triode circuit, which may be a midget relay, operates contact K11 as indicated by the dotted line notation. When V3b is conducting (most of the time) the armature of the relay makes contact with the lower fixed contact; when V3b is non-conducting (only 20 to 100 milliseconds of the time for one sweep period) the armature of the relay is connected to the upper fixed contact. For operation of the transmitter, the upper fixed contact may ground the relay coils that control transmission of a transmitting system and reception of this frequency through a B+ supply. Thus, relay K1 initiates pulse transmission, the duration of which is selectively controlled by the setting of the resistive-capacitive timing network previously set forth.

*The regulated radio frequency-operated high voltage supply for the cathode ray tube*

The high voltage power supply (see Fig. 7) employed in this cathode ray tube display employs an R. F. oscillator, which may be operated at 235 kilocycles per second. Its advantages include compact construction, safety since it employs low value capacitors for filtering and delivers only a limited amount of power, easy stabilization by controlling the screen voltage of the tube oscillator, and cost comparable to that of a conventional 60-cycle per second high-voltage supply.

A tuned step up air coil transformer T401 is the basic component in the R. F. high voltage supply. A "Miller" No. 4525 oscillator coil may be used here. Primary, secondary, and tickler elements are provided. Power for the filaments of the two rectifier tubes (which may be 1X2A tubes) may be obtained by two single turn loops coupled to the tuned circuit as XZ and the loop between Y and the secondary of T401.

The frequency of oscillation is determined chiefly by the resonant frequency of the secondary winding of T401. The natural circuit capacitances that tune this winding include the distributed capacitance of the winding, the capacitance of the rectifying tubes, and the stray wiring capacitance. The primary winding is tuned by a fixed 0.002 microfarad capacitor C409 to approximately the resonant frequency of the secondary. Optimum load regulation requires a coefficient of coupling between the two windings that is much greater than critical. A third winding of the transformer located at the end of the secondary winding opposite from the end occupied by the primary winding is loosely coupled to the secondary and provides good excitation for the oscillator tube (which may be a 6AQ5 tube). For efficiency, the oscillator is operated class C. Without regulation, the rectified no load to full load voltage change is about 18%.

The stabilizing circuit for controlling the screen current of the oscillator employs an inverter (which may be one half of a 12AU7 tube), a pentode difference amplifier (which may be a 12AU6), and the other half of the 12AU7 may be used as a cathode follower in series with the screen grid of the oscillator. V29 is the oscillator tube. A portion of the output voltage from the high voltage negative supply is tapped from a bleeder and compared with a constant minus 75 volts on the cathode of the triode inverter V33b. The grid of the pentode is direct-coupled to the plate of the inverter V33b and its voltage is then compared with a constant plus 75 volts on the cathode of the pentode difference amplifier. Screen current must pass through the cathode follower whose grid is direct-coupled to the plate of the pentode. With regulation, the no load to full load voltage change has been reduced to about 1%. Operation of the particular circuitry has been described in the description of Fig. 7 supra.

Thus it may be seen that my invention introduces means and apparatus whereby greater economy of operation, reduced initial cost due to elimination of all but one of the guns required for such a display, more efficient operation of the circuits and greater possible accuracy due to the electrical synchronization made possible by provision of a single gun multiline (eight-line) multi-scan (eight-scan) display are possible. It may readily be seen that my invention shows an improved design of circuit components and provides for a quick target determination as well as avoiding possible loss of targets in some cases.

A table of suggested element values and names of parts is appended to the specification. However various modifications are contemplated and may obviously be resorted to by those skilled in the art without departing from the spirit and scope of the invention as only a preferred embodiment thereof has been disclosed. Modifications of such components, of circuits, and utilization of circuits other than those shown in the illustrative embodiment to perform like functions in this gear within the purview of one skilled in the art are intended to be within the scope of the invention. The invention may be used for a number of purposes and not restricted to target search purposes. For example medical, chemical and physical applications wherein channelled information is desired are among contemplated applications of this invention. The channels could apply to a plurality of separate physical subjects or a plurality of concepts. The circuitry, apparatus and display shown are merely indicative of the type of system which this invention is designed to illustrate.

Obviously many modifications and variations of the present invention are possible in the light of the above teachings. It is therefore to be understood that within the scope of the appended claims the invention may be practiced otherwise than as specifically described.

| Part: | Designation or value ohms (Ω) |
|---|---|
| Resistors— | |
| R101, R301, R310, R406, R803 | 2M. |
| R102, R214, R215, R403, R501, R702, R704, R705, R707, R722, R708, R710, R711, R713, R714, R716, R717, R719, R720, R721a, R809 | 100K. |
| R103, R603, R605, R608, R611, R614, R617, R620, R623 | 200K. |
| R104, R210 | 5K. |
| R105, R216, R703, R706, R709, R712, R715, R718, R721, R723 | 10K. |
| R106, R312, R801, R808 | 1M. |
| R107, R207, R209 | 1.5M. |
| R108 | 2.5M. |
| R201 | 35K. |
| R202, R203, R204, R311, R409, R410, R508 | 500K. |
| R205, R408 | 750K. |
| R206, R212 | 30K. |
| R208 | 3M. |
| R302, R303, R308, R401 | 50K. |
| R304, R404 | 10M. |
| R305 | 75K. |
| R307 | 2K. |
| R309 | 3K. |
| R402 | 4K. |
| R405 | 5M. |
| R503 | 75. |
| R504, R505 | 25K. |
| R506 | 20K. |
| R507 | 47K. |
| R602, R606, R609, R612, R615, R618, R621, R624 | 470K. |

| Part: | Designation or value ohms (Ω) |
|---|---|
| Resistors— | |
| R805 | 47M. |
| R900 | 2200. |
| Potentiometers— | |
| R211 | 10K. |
| R213 | 20K. |
| R306, R509 | 100K. |
| R407, R502, R629, R631, R633, R635, R637, R639, R641, R643, R806 | 1M. |
| R802, R807 | 500K. |
| R645 | 25K. |
| R804 | 2M. |
| Rheostats— | |
| R601, R604, R607, R610, R613, R616, R619, R622 | 500K. |

| Capacitors— | Micromicrofarads ($\mu\mu f$). |
|---|---|
| C101 | 670. |
| C301 | 10–100 variable |
| C302 | 80. |
| C401 | 500. |
| C505 | 650. |
| C702, C704, C706, C708, C710, C712, C714, C716 | 100. |

| Capacitor— | Microfarads ($\mu f$.) |
|---|---|
| C102, C303, C305 | .01. |
| C201 | .02. |
| C202, C307a, C309, C506, C802 | 1.0. |
| C304, C307 | .0015. |
| C306 | .005. |
| C409, C502 | .002. |
| C402, C403, C407, C408, C610, C612, C614, C616, C601, C602, C603, C604, C605, C606, C607, C608, C618, C620, C622, C624, C626, C801 | .1. |
| C404, C405, C406 | .004. |
| C501, C504 | .05. |
| C609 | 16.0. |
| C611, C613, C615, C617, C619, C621, C623, C625 | .25. |
| C701, C703, C705, C707, C709, C711, C713, C715 | .001. |

| Tube— | Designation |
|---|---|
| V1, V8, V10, V11, V12, V13, V14, V15, V16, V17 | 6AS6. |
| (V2A, V2B), (V3A, V3B), (V4A, V4B), (V33A, V33B), V7A, V7B) | 12AU7. |
| (V5A, V5B) | 6AL5. |
| V6 | 6D4. |
| (V9A, V9B) | 12AT7. |
| V18, V19, V20, V21, V22, V23, V24, V25, V26, V27 | 2D21. |
| V26, V27 | 0B2. |
| V28 | 0A2. |
| V29 | 6AQ5. |
| V30, V31 | 1X2A. |
| V32 | 12AU6. |
| V101 | 5CP7A. |

| Part: | Designation |
|---|---|
| Rectifiers— D601, D602, D603, D604, D605, D606, D607, D608 | 1N38. |

| Part: | Name |
|---|---|
| SW901 | "On-off" |
| SW902 | Interlock. |
| SW701 | Starter. |
| SW601 | Gang rectified-unrectified input. |
| Un-numbered | Range. |
| Un-numbered | Pulse width. |
| K1 | Relay. |
| K11 | Contact of relay 1. |

Transformer:
T401 _____ _____

| Part: | Function |
|---|---|
| (R107, R108) | Pulse width. |
| R211 | Horizontal Position. |
| R213 | Sweep length. |
| (R207, R208) | Range. |
| R806 | Vertical centering. |
| R807 | Astigmatism. |
| R804 | Focus. |
| R802 | Intensity. |

Legend:

$K = 1,000$ or $10^3$ $M = 1,000,000$ or $10^6$ $\mu = \dfrac{1}{1,000,000}$ or $10^{-6}$ $\mu\mu = \dfrac{1}{1,000,000,000,000}$ or $10^{-12}$

What is claimed is:

1. In a fixed target detection system for performing sequential search of successive sectors in discrete steps, apparatus for producing a multi-line A-scan presentation representing an omnidirectional search display comprising means to produce a horizontal sweep on an indicator tube, means to synchronize said sweep with transmitter output pulse energy, means comprised entirely of electronically coupled elements to produce a visual indication of a series of lines vertically separated on the indicator, means responsive to target signal input to produce a vertical deflection on a spaced line observed on the visual indicator.

2. Search target detection and range finding means for performing sequential search of successive sectors in discrete steps, said means comprising a cathode ray tube of the electrostatic type, means to produce a saw tooth voltage, means to amplify said saw tooth voltage, said saw tooth voltage being applied to the horizontal deflection plates of said cathode ray tube to produce an horizontal sweep of an electron beam, means to produce a trigger pulse to key a transmitter, said means to produce the trigger pulse being synchronized with the means to produce a saw tooth voltage, means to generate a multi-cycle pulse signal, means comprised entirely of electronic components constructed and arranged to generate a periodic voltage having discrete incremental levels which are applied to the vertical deflection plates of said cathode ray tube to effect periodic displacement of said sweep causing a visual display of a plurality of vertically spaced horizontal sweep lines each corresponding to a sector of search, said last named means being triggered by said multi-cycle pulse producing means, means responsive to input target signals and synchronized with said periodic voltage to produce said signals at the vertical spacing corresponding to a search sector, the displacement of said signal from the origin of the sweep being proportional to range due to synchronization of the transmitted pulse with the start of horizontal sweep.

3. The device of claim 2 including means to produce intensity modulation on an element of the cathode ray tube coincident with detection of a target signal.

4. Target search and range finding means comprising a cathode ray tube, a free running slow sweep time base generator to produce a saw tooth voltage for horizontal sweep on said cathode ray tube, a push-pull amplifier to amplify output of said slow sweep generator and produce voltages of correct polarity to the horizontal deflection plates of the cathode ray tube to sweep an electron beam from the one side of the tube to the other side of the tube, a one-kick multivibrator triggered by output of said slow sweep time base generator, said one-kick multivibrator producing trigger pulses to trigger a transmitter to emit pulse energy, a multi-cycle master pulse generator to produce a series of pulses, a ring-of-eight thyratron counter, means to start said ring counter, said multi-cycle master pulse generator feeding its pulses into said ring-of-eight thyratron, the ring of eight counter including a plurality of thyratrons firing in succession to produce output pulses at a fraction of the multi-cycle input pulse frequency, a pentode gate stage for each thyratron, each of said pentode gates being unblocked only during firing time of its respective thyratron, means disposed omnidirectionally to pick up target signals representing reflection of the transmitter pulses from a target to receiving means, said target signals being fed into a pentode gate corresponding to a search sector, a common bus line leading from said pentode gates to said cathode ray tube to produce intensity modulation of incoming signals, a staircase wave form generator triggered by the master pulse generator and synchronized by pulses from the first thyratron of the ring of thyratrons to produce a flyback of staircase wave form output, a push-pull amplifier to feed correct staircase wave form output to the upper and lower deflection plates of the cathode ray tube thereby producing a series of vertically spaced electron beams by deflection of said cathode ray tube electron beam at spaced intervals in a vertical plane, said common gate bus line from said pentode gates being fed into the push-pull amplifier following the staircase wave form generator to produce a target pip at a correct spaced point of vertical deflection, thereby introducing target signals on a swept vertical beam line at a correct range, the particular line representing a definite sector of search.

5. Means for producing a multi-line A-scan sweep presentation on a single gun cathode ray tube comprising means to electronically generate a sweep voltage to provide a linear time base for said tube, means comprised entirely of electronically coupled elements to generate a staircase waveform voltage having discrete incremental levels to effect periodic displacement of said time base causing visual display of a plurality of spaced sweep lines each subtending a sector of search, means for producing target signals on the respective line corresponding to a sector from which a signal is received and means for synchronizing the sweep voltage with a pulse output of transmitted energy whereby the position of a signal on its respective line will give a determination of range of the target.

6. Target indicating apparatus for performing sequential search of successive sectors in discrete steps comprising a transmitter to eject output pulses of energy, a receiver to detect and amplify returning energy reflected from a target, said receiver having a plurality of stationary means for directional pickup of target signals, said stationary means each subtending a sector of search and collectively providing omnidirectional search, means to amplify said incoming signals, means to produce a plurality of vertically separated horizontal sweeps on an electro-static cathode ray tube, the starting time of the sweeps being synchronized with the transmitted pulse and means to produce target deflections on the respective sweep lines.

7. In a receiver for detecting target signals, means to produce a multi-line scan, said means comprising a multi-cycle master pulse generator, a staircase wave form generator to produce several constant voltages on the vertical deflection plates of a cathode ray tube, a multi-ring thyratron counter circuit having a plurality of thyratrons, each thyratron having a pulse rate of a fraction of the pulse rate of said master pulse generator, a pentode gate circuit, said pentode gate circuit having a single pentode gate amplifier for each thyratron in said thyratron ring, said pentode gate circuit being normally suppressor-biased to cut-off voltage, target input signal receiving means, signals from said receiving means causing signals at the output of the respective pentode gate tube, said output signals causing deflection modulation to appear as vertical pips on said cathode ray tube at a time corresponding to the firing time of the thyratron of its respective gate tube.

8. Thyratron ring counter and gating circuit apparatus for a multi-line presentation of incoming signals using a single gun cathode ray tube, said thyratron ring counter and gating circuit apparatus comprising a thyratron ring having a plurality of successively firing thyratron tubes in a ring arrangement, each thyratron having an anode, a cathode, a control grid and a second grid, a plurality of pentode gate amplifiers, each of said plurality of pentode gate amplifiers being a respective amplifier for a single thyratron tube of the thyratron ring, input coupling means to take a multiple frequency trigger pulse voltage disposed at the input grid of each of the thyratron stages, a common anode output load for the thyratron stages, a resistor disposed between the second grid of each of said thyratrons and the control grid of a successive thyratron, a bias resistor attached to the control grid of each thyratron, said bias resistor leading from a negative 130 volt power supply voltage, means for applying anode voltage to the pentode gate amplifiers, variable bias means for each of said pentode gate amplifiers, means to supply a negative voltage supply to the suppressor grids of each of the pentode gates so as to normally block each of the pentode gate stages in the absence of unblocking voltage from its firing thyratron, common output means from said pentode gate amplifiers, a common anode load for said thyratron anodes, the coupling means between each thyratron and its respective pentode gate including a thyratron second grid coupled capacitor and a resistor in series with said capacitor and leading to the suppressor grid of the respective gate tube, a starter switch in the thyratron ring, closing of the starter switch in the thyratron ring grounding the grid of the first thyratron tube to temporarily remove its negative bias, a first incoming trigger pulse of multi-cycle frequency input causing said first thyratron to fire when the starter switch is closed, a capacitor being disposed between the suppressor grid of each thyratron and the cathode of its successive thyratron, said capacitor being charged during firing of a first thyratron to lower the grid bias of its succeeding thyratron thus priming the succeeding thyratron and causing it to be fired upon receipt of a second trigger pulse of multi-cycle frequency input, firing of the succeeding tube causing anode voltage to be reduced to a point sufficient to cut off firing of the first thyratron tube, allowing its grid to assume control with a negative voltage bias, successive firing thus occurring at a firing rate of a sub-multiple of the input frequency of multi-cycle trigger pulses.

9. In apparatus for producing a scanned multi-line presentation of incoming signals, mechanism for sequentially introducing channelled incoming signals on the appropriate line of the multi-line presentation comprising a ring thyratron circuit including a plurality of thyratrons, a gate amplifier circuit including a plurality of gate amplifiers, successive ionization of the thyratrons in the ring circuit causing a sampling voltage to be produced to effect successive unblocking of the gate amplifiers, channel signal input means, synchronizing means to synchronize thyratron ionization with sweep, signals from said channel signal input means passing through said gate amplifiers during sampling time only to present the signals on a line of the multi-line presentation corresponding to a particular channel input.

10. A signal transceiver mechanism comprising a sawtooth voltage generator to provide relatively slow speed linear time base, a monostable device responsive to said saw tooth voltage and arranged to produce pulses of predetermined duration for triggering transmitter pulses, amplifier means to amplify the sawtooth voltage and arranged to provide a push-pull sawtooth output to the horizontal deflection plates of an electrostatic cathode ray tube, a multi-cycle master pulse generator, a staircase waveform generator responsive to the pulses from said master pulse generator to coincidentally generate discrete steps of said staircase waveform and including synchronization means for precisely terminating said staircase waveform after a predetermined number of generated steps, a counter circuit constructed and arranged to respond sequentially to pulses from said master pulse generator and including a starter switch to actuate said counter, which counter comprises a plurality of thyratron tubes each arranged to successively produce in the output circuit thereof a bistable voltage having alternate higher and lower static magnitudes, a plurality of stationary means to receive target signals, a corresponding pentode gate amplifier for each of said stationary means responsive to the presence of target signals upon periodic sampling by the higher magnitude voltage supplied from its respective thyratron tube effective to unblock said pentode gate amplifier, and amplifier means to amplify the staircase voltage and arranged to provide a composite push-pull output voltage including said target signals to the vertical deflection plates of the cathode ray tube, said composite push-pull output voltage effecting displacement of the linear sweep causing a visual display of a plurality of sweep lines each corresponding to a sector of search subtended by each of said stationary means with range being proportional to the displacement of target signals from the origin of the sweep.

11. Apparatus to produce an A-scan presentation for omnidirectional display of range and azimuth of a target in a system using fixed transmitting and receiving means comprising a cathode ray tube of electrostatic type, a sawtooth voltage generator to generate a relatively slow speed linear time base, a monostable device responsive to said time base generator to produce pulses of predetermined duration to initiate synchronized triggering of a transmitter, amplifier means responsive to said sawtooth voltage generator to supply a push-pull sawtooth output to the horizontal plates of said cathode ray tube, a master pulse generator, a counter circuit comprised of at least eight thyratron tubes arranged in a ring for sequential firing initiated by pulses supplied from said master pulse generator to produce a periodic sampling voltage during firing, a pentode gate amplifier for each of said thyratron tubes responsive to the sampling voltage to effectively reduce the bias thereon rendering said gate amplifier conductive and including a substantially resistive load in a common plate circuit, signal input means to each of the pentode gate amplifiers to receive reflected signals from a target during sampling time, a staircase waveform generator responsive to the master pulse generator to generate discrete steps of a staircase waveform in synchronism with the selective conductive periods of the gate amplifiers and including a thyratron responsive to the sampling voltage of one of the thyratrons in the counter circuit to precisely terminate the staircase waveform after eight steps, and amplifier means to amplify the staircase voltage and arranged to provide a composite push-pull output voltage including target signals developed in the common plate circuit, to the vertical deflection plates of the cathode ray tube causing a visual display of a plurality of spaced sweep lines each corresponding to a sector of search collectively effecting an omnidirectional search display with range being proportional to displacement of target signals from the origin of the sweep.

12. Apparatus for performing sequential search of successive sectors in discrete steps using a single gun cathode ray tube for presenting a multi-line A-scan omnidirectional display, comprising stationary multi-channel target detection means in which each channel subtends a sector of search and said channels collectively provide omnidirectional search, a sawtooth voltage generator to produce a relatively slow speed linear time base for said cathode ray tube, amplifier means for said sawtooth voltage, a monostable device responsive to said sawtooth generator to produce pulses of predetermined duration for triggering of transmitter pulses, a multi-cycle master pulse generator, a sequential counter circuit constructed and arranged in a ring having a plurality of stages responsive to the pulses of said master pulse generator to successively produce in the load impedance of each stage a bistable voltage having alternate higher and lower static magnitudes causing a synchronization pulse to occur in the counter having a cyclic rate which is a fraction of the repetition frequency of said master pulse generator, a staircase waveform generator comprising a capacitively coupled diode section including a capacitive storage element responsive to the pulses from said master pulse generator to coincidently generate discrete increments of said staircase waveform, and a thyratron stage including in its cathode circuit said capacitive storage element and arranged to precisely terminate said staircase waveform after a predetermined number of generated increments in response to said synchronization pulse firing the thyratron into ionization, a plurality of pentode gate amplifiers each periodically sampled by the higher magnitude voltage supplied from its respective stage of the sequential counter to effect reduction of bias and render each pentode gate amplifier responsive to channel target signals of the target detection means, and amplifier means to amplify the staircase waveform constructed to supply a composite staircase including said target signal voltages to the cathode ray tube, said composite voltage effecting displacement of the linear time base causing a visual display of a plurality of sweep lines each corresponding to a sector of search with range being proportional to displacement of target signals from the origin of the time base.

13. In an omnidirectional target detection apparatus for producing target indications on a multi-line A-scan presentation, a staircase waveform generator comprising a thyratron, an energy storage counter circuit including a capacitively coupled diode section and a capacitive storage element in the cathode of said thyratron to convert a multi-pulse input to a staircase waveform, a synchronized pulse input to initiate firing of said thyratron to precisely terminate the number of steps of the staircase waveform after a predetermined amount of negative increments have been generated across said capacitive storage element corresponding to a predetermined number of lines desired in the A-scan presentation.

14. In a multi-line A-scan omnidirectional display system for a single gun cathode ray tube, a thyratron ring counter and gating circuit apparatus comprising, a plurality of successive thyratron stages constructed and arranged in a ring for sequential firing, a corresponding plurality of gate amplifier stages for said thyratron stages and including respective signal channel input means and a common plate load to produce a common signal output, means including a load impedance in the cathode of each of said thyratrons to produce a bistable voltage having alternate lower and higher static magnitudes to periodically condition an adjacent thyratron for firing and to sample the respective gate amplifier stages for target signals by effecting reduction of bias for a duration coincident with the higher magnitude voltage allowing unblocking thereof, a master pulse generator to furnish a multi-cycle trigger pulse to the grid input of each thyratron to sequentially initiate firing of the conditioned thyratron, a starter switch to initially condition a stage of the thyratron ring counter into cyclic operation at a recurrence rate which is a fraction of the frequency of the master pulse generator, the target signals produced in the common plate load being applied to the cathode ray tube for presentation, whereby the range is proportional to the displacement of said target signals from the origin of the multi-line A-scan with direction being indicated by a particular line on said display corresponding to the signal channel input means.

15. Apparatus to produce a multi-line A-scan presentation for range and direction indication of target signals on a cathode ray tube using a single gun in an omnidirectional search system employing fixed target detection means, said apparatus comprising, a pulse generator, means responsive to the pulses from said pulse generator to produce a periodic staircase waveform voltage having discrete incremental steps of uniform duration to effect a multi-line presentation on the cathode ray tube, a thyratron counter comprised of a plurality of thyratrons, each including a resistive load in the cathode to produce a positive sampling voltage, arranged in a ring to fire sequentially in coincident response to pulses from said pulse generator, a corresponding plurality of pentode gates including a common plate load constructed and arranged to selectively respond to the positive sampling voltage periodically impressed on suppressor grids thereof to effect reduction of bias and unblocking of a pentode gate, and means to impress signals from a plurality of signal channels onto the respective grid inputs of said pentode gates to produce target signals in the common plate load during sampling and applied to the cathode ray tube, the thyratron ring counter being synchronized with the staircase waveform voltage to effect a coordinated multi-line presentation, whereby each line corresponds to a designated signal channel to give directional indication with range being proportional to displacement of the target signals from the origin of the multi-line A-scan presentation.

16. Apparatus for producing a multi-line A-scan presentation using a single gun cathode ray tube for sequential display of a plurality of channel signals comprising, a master pulse generator comprising, a relaxation oscillator, an amplifier stage including a short time constant resistive-capacitive coupling network to effect differentiation, and a cathode follower, a staircase waveform generator means including a twin diode section capacitively coupled to the cathode follower and having series capacitive storage elements in a voltage divider arrangement to generate discrete increments of the staircase waveform in response to the output pulses from said cathode follower, a thyratron stage responsive to a synchronization pulse to precisely terminate said staircase waveform after a predetermined number of generated increments by initiating ionization to effect a low impedance discharge path for said series storage elements in the cathode circuit of said thyratron stage, amplifier means constructed and arranged to apply a composite push-pull staircase voltage including channel signals to the cathode ray tube, a sequential counter circuit constructed and arranged in a ring having a plurality of thyratron stages sequentially responsive to the output pulses of said cathode follower to successively produce in the load impedance of each stage of bistable voltage having alternate higher and lower static magnitudes, said counter having a cyclic rate equal to the quotient of the pulse repetition frequency of the master pulse generator divided by the number of stages in the ring counter to effect said synchronization pulse, a corresponding plurality of pentode gate amplifiers each periodically sampled by the higher magnitude voltage applied to the suppressor grid thereof from its respective thyratron stage of the sequential counter to effect reduction of bias thereon rendering each pentode amplifier selectively responsive to channel target signals, said composite voltage causing displacement of a linear time base on said cathode ray tube to effect visual display of a plurality of sweep lines each corresponding to a sector of search subtended by a channel with range being proportional to displacement of target signals from the origin of said time base.

17. Apparatus to produce a multi-line A-scan presentation for omnidirectional display of range and azimuth of a target in a system using fixed multi-channel target detection means for sequential search of successive sectors comprising, a cathode ray tube, a sawtooth voltage generating means to generate a relatively slow speed linear time base, means responsive to said sawtooth voltage generating means to effect synchronized triggering of transmitter pulses comprising, a one-kick multivibrator including a clamping stage and a plurality of selectively engageable resistors in a resistive-capacitive timing network to produce monostable output pulses of predetermined duration in coincident response with the flyback of said sawtooth voltage, and a relay actuated by said monostable output pulses to effect triggering of transmitter pulses having a duration commensurate with the setting of said timing network, a multicycle master pulse generator, means responsive to said master pulse generator to generate a staircase waveform, a counter circuit constructed and arranged to respond sequentially to pulses from said master pulse generator to produce a cyclic sampling voltage, a plurality of gating amplifier means selectively responsive to said sampling voltage to accept target signals from said multi-channel target detection means, amplifier means constructed and arranged to provide a composite voltage including said staircase waveform and target signals to be applied to the cathode ray tube to effect a plurality of sweep lines to be visually displayed each corresponding to a sector of search with range being proportional to displacement of target signals from the origin of the time base.

18. Apparatus to produce a multi-line A-scan presentation for omnidirectional display of range and azimuth of a target in a system using fixed multi-channel target detection means for sequential search of successive sectors comprising, a cathode ray tube, sawtooth voltage generating means including a phantastron sweep circuit and a plurality of selectively engageable resistors in a resistive-capacitive timing network to produce a linear time base of length corresponding to a desired range, means responsive to said sawtooth voltage generating means to effect synchronized triggering of transmitter pulses comprising, a one-kick multivibrator including a diode clamping stage and a plurality of selectively engageable resistors in a resistive-capacitive timing network to produce monostable output pulses of predetermined duration in coincident response with the flyback of said sawtooth voltage, and a relay actuated by said monostable output pulses to effect triggering of transmitter pulses having a duration commensurate with the setting of said latter timing network, a multi-cycle master pulse generator, means responsive to said master pulse generator to generate a staircase waveform, a counter circuit constructed and arranged to respond sequentially to pulses from said master pulse generator to produce a cyclic sampling voltage, a plurality of gating amplifier means selectively responsive to said sampling voltage to accept target signals from said multi-channel target detection means and including a common resistive plate load to develop said target signals, amplifier means constructed and arranged to effect a composite voltage including said staircase waveform and target signals to be applied to the cathode ray tube to cause a plurality of sweep lines to be visually displayed, each sweep line corresponding to a sector of search with range being proportional to displacement of target signals from the origin of the time base, said target signals produced in the common resistive plate load being of negative polarity to effect intensity modulation of the cathode of said cathode ray tube coincident with target signal displacement observed on said display.

References Cited in the file of this patent

UNITED STATES PATENTS

| | | |
|---|---|---|
| 2,386,548 | Fogel | Oct. 9, 1945 |
| 2,405,238 | Seeley | Aug. 6, 1946 |
| 2,610,320 | Hall | Sept. 9, 1952 |
| 2,644,917 | Smith | July 7, 1953 |
| 2,682,657 | Haworth | June 29, 1954 |